(12) United States Patent
Zhao et al.

(10) Patent No.: US 10,690,525 B2
(45) Date of Patent: Jun. 23, 2020

(54) SYSTEMS AND METHODS ASSOCIATED WITH UNMANNED AERIAL VEHICLE TARGETING ACCURACY

(71) Applicant: General Electric Company, Schenectady, NY (US)

(72) Inventors: Yang Zhao, Niskayuna, NY (US); Huan Tan, Clifton Park, NY (US); Steven Gray, Niskayuna, NY (US); Ghulam Baloch, Niskayuna, NY (US); Mauricio Castillo-Effen, Rexford, NY (US); Judith Guzzo, Niskayuna, NY (US); Shiraj Sen, Niskayuna, NY (US); Douglas Forman, Schenectady, NY (US)

(73) Assignee: GENERAL ELECTRIC COMPANY, Schenectady, NY (US)

( * ) Notice: Subject to any disclaimer, the term of this patent is extended or adjusted under 35 U.S.C. 154(b) by 243 days.

(21) Appl. No.: 15/861,054

(22) Filed: Jan. 3, 2018

(65) Prior Publication Data

US 2019/0204123 A1    Jul. 4, 2019

(51) Int. Cl.
*G01D 18/00* (2006.01)
*B64C 39/02* (2006.01)
(Continued)

(52) U.S. Cl.
CPC ............ *G01D 18/00* (2013.01); *B64C 39/024* (2013.01); *G01C 19/5776* (2013.01);
(Continued)

(58) Field of Classification Search
CPC ..................................................... G01D 18/00
(Continued)

(56) References Cited

U.S. PATENT DOCUMENTS 7,092,109 B2    8/2006  Satoh et al.
8,060,270 B2   11/2011  Vian et al.
(Continued)

FOREIGN PATENT DOCUMENTS

CN        102510011 B     10/2014

OTHER PUBLICATIONS

Tahar, Khairul Nizman et al., "Aerial Mapping Using Autonomous Fixed-Wing Unmanned Aerial Vehicle", 2012 IEEE 8th International Colloquium on Signal Processing and its Applications, Melaka, Mar. 23-25, 2012, ISSN: 978-1-4673-0961-5, (pp. 164-168, 5 total pages).

(Continued)

*Primary Examiner* — Ricky Ngon
(74) *Attorney, Agent, or Firm* — Fletcher Yoder, P.C.

(57) ABSTRACT

System and methods may evaluate and/or improve target aiming accuracy for a sensor of an Unmanned Aerial Vehicle ("UAV"). According to some embodiments, a position and orientation measuring unit may measure a position and orientation associated with the sensor. A pose estimation platform may execute a first order calculation using the measured position and orientation as the actual position and orientation to create a first order model. A geometry evaluation platform may receive planned sensor position and orientation from a targeting goal data store and calculate a standard deviation for a target aiming error utilizing: (i) location and geometry information associated with the industrial asset, (ii) a known relationship between the sensor and a center-of-gravity of the UAV, (iii) the first order model as a transfer function, and (iv) an assumption that the position and orientation of the sensor have Gaussian-distributed noises with zero mean and a pre-determined standard deviation.

19 Claims, 17 Drawing Sheets

(51) Int. Cl.
| | |
|---|---|
| *G01C 23/00* | (2006.01) |
| *G01C 19/5776* | (2012.01) |
| *G01S 17/06* | (2006.01) |
| *G06T 7/77* | (2017.01) |
| *G06K 9/62* | (2006.01) |
| *G06T 7/73* | (2017.01) |
| *G01C 21/20* | (2006.01) |
| *G01S 17/89* | (2020.01) |
| *G05D 1/00* | (2006.01) |
| *H04N 5/232* | (2006.01) |
| *G01S 17/86* | (2020.01) |

(52) U.S. Cl.
CPC .............. *G01C 21/20* (2013.01); *G01C 23/00* (2013.01); *G01S 17/06* (2013.01); *G01S 17/86* (2020.01); *G01S 17/89* (2013.01); *G05D 1/0094* (2013.01); *G06K 9/6202* (2013.01); *G06T 7/74* (2017.01); *G06T 7/77* (2017.01); *H04N 5/23258* (2013.01); *B64C 2201/127* (2013.01); *B64C 2201/141* (2013.01); *G06T 2207/30244* (2013.01)

(58) Field of Classification Search
USPC ........................................................ 702/116
See application file for complete search history.

(56) References Cited

U.S. PATENT DOCUMENTS

| | | | |
|---|---|---|---|
| 8,392,045 | B2 | 3/2013 | Vian et al. |
| 8,855,846 | B2 | 10/2014 | Grzywna |
| 9,074,848 | B1* | 7/2015 | Hunter, Jr. ............ F41G 7/2226 |
| 9,513,635 | B1 | 12/2016 | Bethke et al. |
| 9,607,219 | B2 | 3/2017 | Greveson et al. |
| 9,740,200 | B2 | 8/2017 | Bethke et al. |
| 10,032,285 | B1* | 7/2018 | Ma ......................... G06T 7/277 |
| 2005/0114023 | A1* | 5/2005 | Williamson ......... G01C 21/165 |
| | | | 701/472 |
| 2014/0050352 | A1* | 2/2014 | Buehler ............... G06K 9/0063 |
| | | | 382/103 |
| 2015/0248584 | A1* | 9/2015 | Greveson .................. G06T 7/73 |
| | | | 382/113 |
| 2016/0078759 | A1* | 3/2016 | Nerayoff .............. G06Q 20/145 |
| | | | 701/3 |
| 2017/0248967 | A1 | 8/2017 | Krogh et al. |
| 2019/0197292 | A1* | 6/2019 | Abeywardena ...... G08G 5/0086 |
| 2019/0204093 | A1* | 7/2019 | Cantrell .................. G06F 16/29 |

OTHER PUBLICATIONS

Angelino, Cesario Vincenzo et al., "UAV Position and Attitude Estimation using IMU, GNSS and Camera", 2012 15th International Conference on Information Fusion, Singapore, Jul. 9-12, 2012, (pp. 735-742, 8 total pages).

Ramani, Aditya et al., "Determining Intruder Aircraft Position using Series of Stereoscopic 2-D Images", 2017 International Conference on Unmanned Aircraft Systems (ICUAS), Miami, Jun. 13-16, 2017, ISSN: 978-1-5090-4494-8, (pp. 902-911, 10 total pages).

Kanellakis, Christoforos et al., "Survey on Computer Vision for UAVs: Current Developments and Trends", J Intell Robot Syst., vol. 87, 2017, DOI: 10.1007/s10846-017-0483-z, (pp. 141-168, 28 total pages).

Dos Santos Marques, Nuno Miguel, Thesis: "Integrated Architecture for Vision-based Indoor Localization and Mapping of a Quadrotor Micro-air Vehicle", Oct. 2014, 118pgs.

Teulière, Céline et al., "3D model-based tracking for UAV position control", Intelligent Robots and Systems, 2010, DOI: 10.1109/IROS.2010.5649700, 6pgs.

Post, T.H. (Tjark) "Precise location of a UAV using visual odometry", MSc Report, Robotics and Mechatronics, Dec. 2015, 58pgs.

Řezáč, Ing. Martin "Inertial stabilization, estimation and visual servoing for aerial surveillance", Oct. 2013, Czech Technical University in Prague, (cover 8pgs + 1-52pgs, 60 total pages), Part 1.

Řezáč, Ing. Martin "Inertial stabilization, estimation and visual servoing for aerial surveillance", Oct. 2013, Czech Technical University in Prague, Chapter 4, (pp. 53-101, 49 total pages), Part 2.

Řezáč, Ing. Martin "Inertial stabilization, estimation and visual servoing for aerial surveillance", Oct. 2013, Czech Technical University in Prague, Chapter 4, (pp. 102-157, 56 total pages), Part 3.

International Search Report/Written Opinion; PCT/US2018/062427 dated May 6, 2019, pp. 19.

Anwar, Hamza; "A Framework for Aerial Inspection of Siltation in Waterways", International Conference on Intelligen Robots and Systems (IROS), 2015, pp. 6273-6278.

* cited by examiner

| ASSET INSPECTION IDENTIFIER 1602 | ASSET IDENTIFIER 1604 | 3D MODEL DATA 1606 | INSPECTION PLAN DATA 1608 | COLLECTED SENSOR DATA 1610 | TARGET AIMING ACCURACY 1612 |
|---|---|---|---|---|---|
| AI_101 (JULY 1, 2020) | A_101 | POI_101, POI_102... | | | 22.5% |
| AI_102 (JULY 2, 2020) | A_101 | POI_102, POI_104... | | | 3.4° |
| AI_103 (JULY 3, 2020) | A_101 | POI_103, POI_104... | | | ACCURATE |
| AI_201 (JULY 1, 2020) | A_102 | POI_201, POI_202... | | | INACCURATE |
| AI_202 (JULY 2, 2020) | A_102 | POI_201... | | | 54 cm |

SYSTEMS AND METHODS ASSOCIATED WITH UNMANNED AERIAL VEHICLE TARGETING ACCURACY

BACKGROUND

The subject matter disclosed herein relates to unmanned aerial vehicles, and more particularly, to evaluating and/or improving target aiming accuracy for unmanned aerial vehicles.

Various entities may own or maintain different types of industrial assets as part of their operation. Such assets may include physical or mechanical devices or structures, which may, in some instances, utilize electrical and/or chemical technologies. Such assets may be used or maintained for a variety of purposes and may be characterized as capital infrastructure, inventory, or by other nomenclature depending on the context. For example, industrial assets may include distributed assets, such as a pipeline or an electrical grid, as well as individual or discrete assets, such as a wind turbine, airplane, a flare stack, vehicle, etc. Assets may be subject to various types of defects (e.g., spontaneous mechanical defects, electrical defects, or routine wear-and-tear) that may impact operation. For example, over time, an industrial asset may undergo corrosion or cracking due to weather or may exhibit deteriorating performance or efficiency due to the wear or failure of one or more component parts.

To look for potential defects, one or more aerial inspection robots equipped with sensors might be used to inspect an industrial asset. For example, a drone might be configured to fly in the proximity of an industrial flare stack taking pictures of various points of interest. As part of this process, an autonomous (or semi-autonomous) drone might follow a pre-determined flight path and/or make on-the-fly navigation decisions to collect data as appropriate. The collection of data will typically involve moving the drone to a pre-determined location and orienting an independently movable sensor (e.g., a camera) toward the point of interest. There can be errors, however, in both the location of the drone and the orientation of the sensor (e.g., flight control errors, gimbal sensor noise, etc.) that can result in the sensor pointing (or "target aiming") to an incorrect location (e.g., a camera might be pointed 15 degrees away from an actual point of interest on an asset). This can reduce the usefulness of the asset inspection. This can be especially true when a planned inspection will take a substantial amount of time, the inspection can potentially take various routes, there are many points of interest to be examined, the asset and/or surrounding environment are complex and dynamically changing, sudden changes in the lighting or environmental conditions (e.g., a gust of wind), etc.

It would therefore be desirable to provide systems and methods to evaluate and/or improve target aiming accuracy in an automated and efficient manner.

SUMMARY

According to some embodiments, a position and orientation measuring unit may measure a position and orientation associated with a UAV sensor. A pose estimation platform may execute a first order calculation using the measured position and orientation as the actual position and orientation to create a first order model. A geometry evaluation platform may receive planned sensor position and orientation from a targeting goal data store and calculate a standard deviation for a target aiming error utilizing: (i) location and geometry information associated with the industrial asset, (ii) a known relationship between the sensor and a center-of-gravity of the UAV, (iii) the first order model as a transfer function, and (iv) an assumption that the position and orientation of the sensor have Gaussian-distributed noises with zero mean and a pre-determined standard deviation.

According to other embodiments, a targeting goal data store may contain electronic records representing planned sensor position and orientation, and a position and orientation measuring unit may measure a position and orientation associated with the sensor. A pose estimate unit may be coupled to the position and orientation unit, and an image feature extraction unit may receive image data from a camera of the UAV. An extended Kalman filter may generate an adjusted transformation of the image data, and a geometry evaluation platform may: receive the adjusted transformation of the image, receive the planned sensor position and orientation, and compare the adjusted transformation of the image data with the planned sensor position and orientation based on a feature matching algorithm to calculate a target aiming error. An evaluation result data store may contain electronic records associated with the calculated target aiming error.

According to still other embodiments, a three-dimensional model data may store containing electronic records comprising a three-dimensional model of an industrial asset, the three-dimensional model including locations of a plurality of points of interest associated with the industrial asset. A UAV location and pose platform may include: a first sensor providing a relatively accurate pose estimation at a relatively low update frequency; a second sensor providing a less accurate pose estimation, as compared to the first sensor, at a relatively high update frequency; a first extended Kalman filter provides an estimation of the pose by sampling data from the first and second sensors at a rate based on the first sensor's update frequency; and a second extended Kalman filter runs at a rate based on the second sensor's update frequency using data from the second sensor as a major input and data from the first sensor as a correction signal. A projection computing platform may receive: (i) an estimated current location and pose of the UAV from the UAV location and pose platform, (ii) an orientation of a gimbal coupled to the UAV to rotate the sensor, (iii) a location of the industrial asset from the three-dimensional model data store, and (iv) an indication of a predefined inspection point associated with the industrial asset. A proportion integration controller may then compute a targeting point on the industrial asset using the following serial transformation:

$$T = T_{UAV}^{gimbal} T_{asset}^{UAV}$$

where $T_{UAV}^{gimabal}$ represents a relation between the gimbal and the UAV and $T_{asset}^{UAV}$ represents a relation between the UAV and the industrial asset.

Some embodiments may comprise: means for measuring, by a position and orientation measuring unit, a position and orientation associated with a sensor of a UAV; means for executing, by a pose estimation platform, a first order calculation using the measured position and orientation as the actual position and orientation to create a first order model; means for receiving, by a geometry evaluation platform, planned sensor position and orientation from a targeting goal data store; means for calculating a standard deviation for a target aiming error of the sensor's projected location on an industrial asset being inspected utilizing: (i) location and geometry information associated with the industrial asset, (ii) a known relationship between the sensor and a center-of-gravity of the UAV, (iii) the received first order model as a transfer function, and (iv) an assumption that the position and orientation of the sensor have Gaussian-distributed noises with zero mean and a pre-determined standard deviation; and means for storing, in an evaluation result data store, electronic records associated with the calculated target aiming error.

Other embodiments may comprise: means for storing, in a targeting goal data store, electronic records representing planned sensor position and orientation; means for measuring, by a position and orientation measuring unit, a position and orientation associated with the sensor; means for generating, by an extended Kalman filter, coupled to a pose estimation platform and an image feature extraction unit, an adjusted transformation of image data; means for comparing, by geometry evaluation platform, the adjusted transformation of the image data with the planned sensor position and orientation based on a feature matching algorithm to calculate a target aiming error; and means for storing electronic records associated with the calculated target aiming error in an evaluation result data store.

Still other embodiments may comprise: means for storing, in a three-dimensional model data store, electronic records comprising a three-dimensional model of an industrial asset, the three-dimensional model including locations of a plurality of points of interest associated with the industrial asset; means for receiving, at a UAV location and pose platform, data from a first sensor providing a relatively accurate pose estimation at a relatively low update frequency; means for receiving, at the UAV location and pose platform, data from a second sensor providing a less accurate pose estimation, as compared to the first sensor, at a relatively high update frequency; means for providing an estimate of the pose from a first extended Kalman filter by sampling data from the first and second sensors at a rate based on the first sensor's update frequency; means for running a second extended Kalman filter at a rate based on the second sensor's update frequency using data from the second sensor as a major input and data from the first sensor as a correction signal; means for receiving, at a projection computing platform: (i) an estimated current location and pose of the UAV from the UAV location and pose platform, (ii) an orientation of a gimbal coupled to the UAV to rotate the sensor, (iii) a location of the industrial asset from the three-dimensional model data store, and (iv) an indication of a predefined inspection point associated with the industrial asset; and means for computing, by a proportion integration controller, a targeting point on the industrial asset using the following serial transformation:

$$T = T_{UAV}{}^{gimbal} T_{asset}{}^{UAV}$$

where $T_{UAV}{}^{gimabal}$ represents a relation between the gimbal and the UAV and $T_{asset}{}^{UAV}$ represents a relation between the UAV and the industrial asset.

Technical advantages of some embodiments disclosed herein include improved systems and methods to evaluate and/or improve target aiming accuracy in an automated and efficient manner.

BRIEF DESCRIPTION OF THE DRAWINGS

FIG. 16 is a tabular portion of an asset inspection database according to some embodiments.

DETAILED DESCRIPTION

Figure 1:
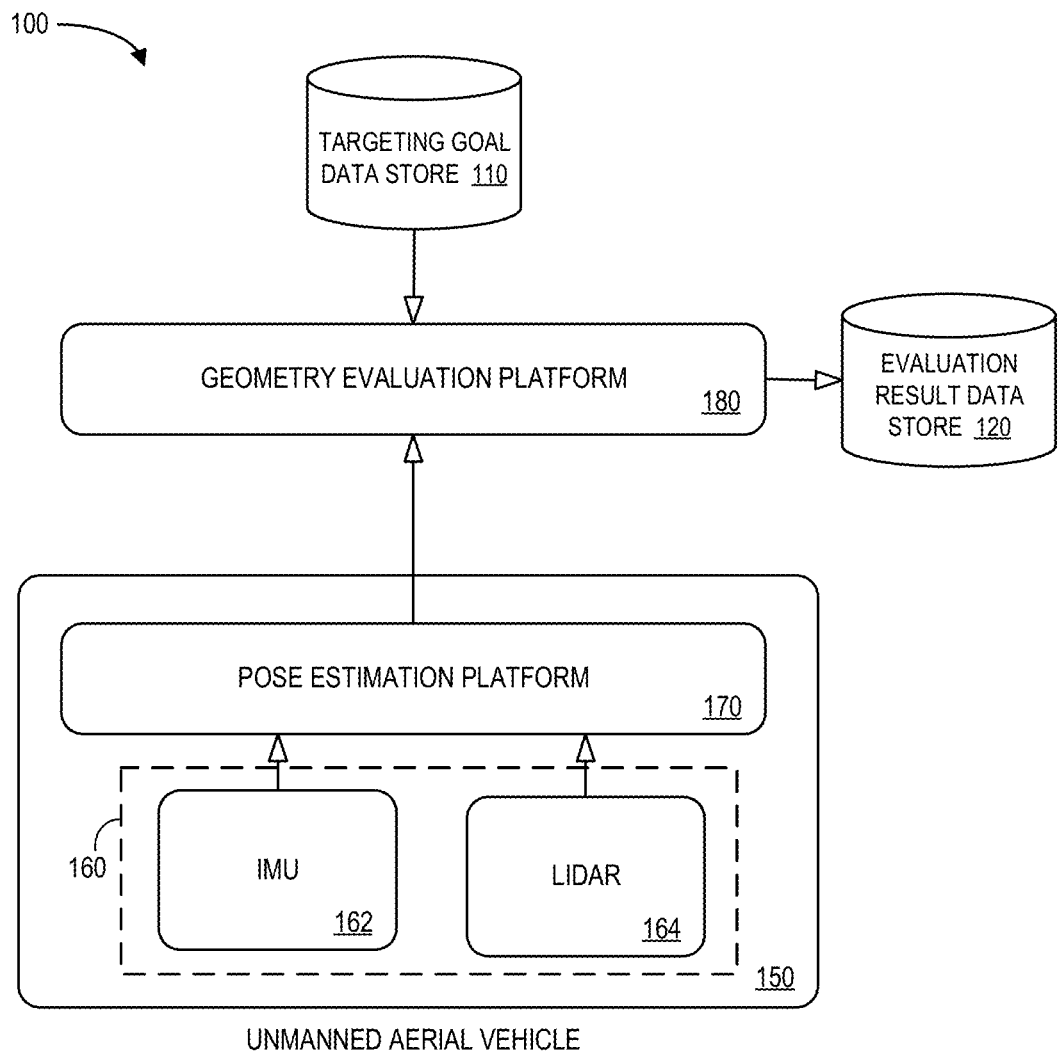
FIG. 1 is a high-level block diagram of target aiming accuracy evaluation system in accordance with some embodiments.

In the following detailed description, numerous specific details are set forth in order to provide a thorough understanding of embodiments. However, it will be understood by those of ordinary skill in the art that the embodiments may be practiced without these specific details. In other instances, well-known methods, procedures, components and circuits have not been described in detail so as not to obscure the embodiments.

Some embodiments described herein relate to an Unmanned Aerial Vehicle ("UAV"), also referred to as an Unmanned Aerial System ("UAS"), that is acting as an autonomous asset inspection robot monitor. Such embodiments may be useful when inspecting industrial assets associated with various entities, including business or corporate entities, governments, individuals, non-profit organizations, and so forth. As discussed herein, such assets may be generally discrete or limited in their extent (e.g., a vehicle such as a plane, helicopter, ship, submersible, space launch vehicle, satellite, locomotive, and so forth) or may be geographically distributed (e.g., a road or rail track, a port or airport, a pipeline or electrical infrastructure, a power generation facility or manufacturing plant, and so forth). Some embodiments described herein may be used to inspect assets of these types (as well as others not listed) in an autonomous or semi-autonomous manner using robotic agents.

With this in mind, it will be appreciated that in a variety of fields, assets, such as distributed assets and/or individual assets, may be used to perform any number of operations. Over time, assets may deteriorate due to weather, physical wear, or the like. For example, over months or years, one or more components of an asset may wear or deteriorate due to rain and wind or other environmental conditions or due to inadequate maintenance. Alternatively, in some instances, spontaneous failures of one or more components or systems of an asset may occur which may be unrelated to wear or maintenance conditions but may instead be attributable to an undetected defect or an unknown stressor. Regardless of whether an asset defect is due to gradual process or a sudden occurrence, understanding the health of the asset depends on inspecting for such defects in a timely and effective manner.

The knowledge of positioning and targeting/aiming accuracies of an inspection UAV can be very important to the success of an inspection task. It may also impact decision making and motion/action planning processes for an inspection. For example, an operator may plan a motion path for a high accuracy UAV to navigate very close to an asset to obtain high resolution images. Note, however, that positioning and aiming accuracies may depend on both flight controller and on-board sensors, and the accuracies can vary under different weather and environmental conditions. For example, a UAV may achieve high positioning accuracy under normal weather condition with clear sky view (e.g., to obtain a strong Global Positioning Satellite ("GPS") signal, while the same system can fail to achieve centimeter-level positioning accuracy under windy condition (or in an environment with few line-of-sight GPS satellites). In addition, many UAV vendors only provide specifications for on-board sensors under certain conditions. Thus, for a successful inspection plan in specific environmental and weather conditions, calibration experiments and analysis tools may be needed to obtain accurate knowledge of UAV positioning and aiming accuracies.

It would therefore be desirable to provide systems and methods to evaluate and/or improve target aiming accuracy in an automated and efficient manner. FIG. 1 is a high-level block diagram of a system 100 according to some embodiments of the present invention. In particular, the system 100 includes a geometry evaluation platform 180 that receives information from an UAV 150 and a targeting goal data store 110. The geometry evaluation platform 180 evaluates targeting aim accuracy of the UAV 150 (e.g., post-flight) and stores information to an evaluation result data store 120 (e.g., for post-flight or "off-line" processing). The UAV 150 includes a pose estimation platform 170 that receives information from one or more sensing systems 160, such as an Inertial Measurement Unit ("IMU") and Light Detection and Ranging ("LIDAR") device 165, and forwards information to the geometry evaluation platform 180.

The targeting goal data store 110 may store a set of electronic records defining a three-dimensional model of an industrial asset including a plurality of points of interest, and the evaluation result data store 120 may store a set of electronic records reflecting target aiming accuracy associated with an inspection plan defining a path of movement for the UAV 150. The UAS UAV and/or geometry evaluation platform 180 may also exchange information with remote human operator devices (e.g., via a firewall). According to some embodiments, a user interface of the geometry evaluation system 180 may communicate with front-end operator devices, access information in the targeting goal data store 110 and/or the evaluation result data store 120, and facilitate the presentation of interactive user interface displays to a human operator. Note that the UAV 150 and/or geometry evaluation platform 180 might also be associated with a third party, such as a vendor that performs a service for an enterprise.

The geometry evaluation platform 180 might be, for example, associated with a Personal Computer ("PC"), laptop computer, smartphone, an enterprise server, a server farm, and/or a database or similar storage devices. According to some embodiments, an "automated" geometry evaluation platform 180 may automatically evaluate target aiming accuracy. As used herein, the term "automated" may refer to, for example, actions that can be performed with little (or no) intervention by a human.

As used herein, devices, including those associated with the geometry evaluation platform 180 and any other device described herein, may exchange information via any communication network which may be one or more of a Local Area Network ("LAN"), a Metropolitan Area Network ("MAN"), a Wide Area Network ("WAN"), a proprietary network, a Public Switched Telephone Network ("PSTN"), a Wireless Application Protocol ("WAP") network, a Bluetooth network, a wireless LAN network, and/or an Internet Protocol ("IP") network such as the Internet, an intranet, or an extranet. Note that any devices described herein may communicate via one or more such communication networks.

The geometry evaluation platform 180 may store information into and/or retrieve information from the targeting goal data store 110 and/or the evaluation result data store 120. The targeting goal data store 110 and/or the evaluation result data store 120 may contain data that was downloaded, received from a UAV vendor or manufacturer, that was originally input by an operator of an enterprise, that was generated by the geometry evaluation platform 180, etc. The targeting goal data store 110 and/or the evaluation result data store 120 may be locally stored or reside remote from the geometry evaluation platform 180. As will be described further below, the targeting goal data store 110 and/or the evaluation result data store 220 may be used by the geometry evaluation platform 180 to provide post-flight processing associated with target aiming accuracy. Although a single geometry evaluation platform 180 and UAV 150 are shown in FIG. 1, any number of such devices may be included. Moreover, various devices described herein might be combined according to embodiments of the present invention. For example, in some embodiments, the geometry evaluation platform 180, targeting goal data store 110 and/or the evaluation result data store 120 be co-located and/or may comprise a single apparatus.

In some cases, autonomous inspection "robots" may fly themselves and/or be wirelessly controlled via a control system (e.g., by a human monitor using the remote device 160). As used herein, the term "robot" might refer to a machine (e.g., an electro-mechanical apparatus) capable of carrying out a set of tasks (e.g., movement of all or part of the machine, operation of one or more type of sensors to acquire sensed data or measurements, and so forth) automatically (e.g., at least partially without input, oversight, or control by an operator), such as a set of tasks programmed by a computer. Note that an autonomous inspection robot may include one or more sensors to detect one or more characteristics of an industrial asset. The UAV 150 may also include a processing system that includes one or more processors operatively coupled to memory and storage components.

According to some embodiments, the system 100 may automatically evaluate target aiming. Note that actual positioning accuracy may involves two major error sources: 1) GPS and IMU sensor noise, and 2) flight control error. For aiming accuracy, the sources of error may be more complex, including GPS and IMU sensor noise, gimbal sensor noise, gimbal control error, flight control error, etc. which all may contribute to an overall total aiming error. That is, the actual total aiming error may comprise a combination of control errors (flight controller, gimbal controller) and sensing errors (GPS, IMU sensors) and these error sources may be deeply coupled in a UAV system.

Figure 2:
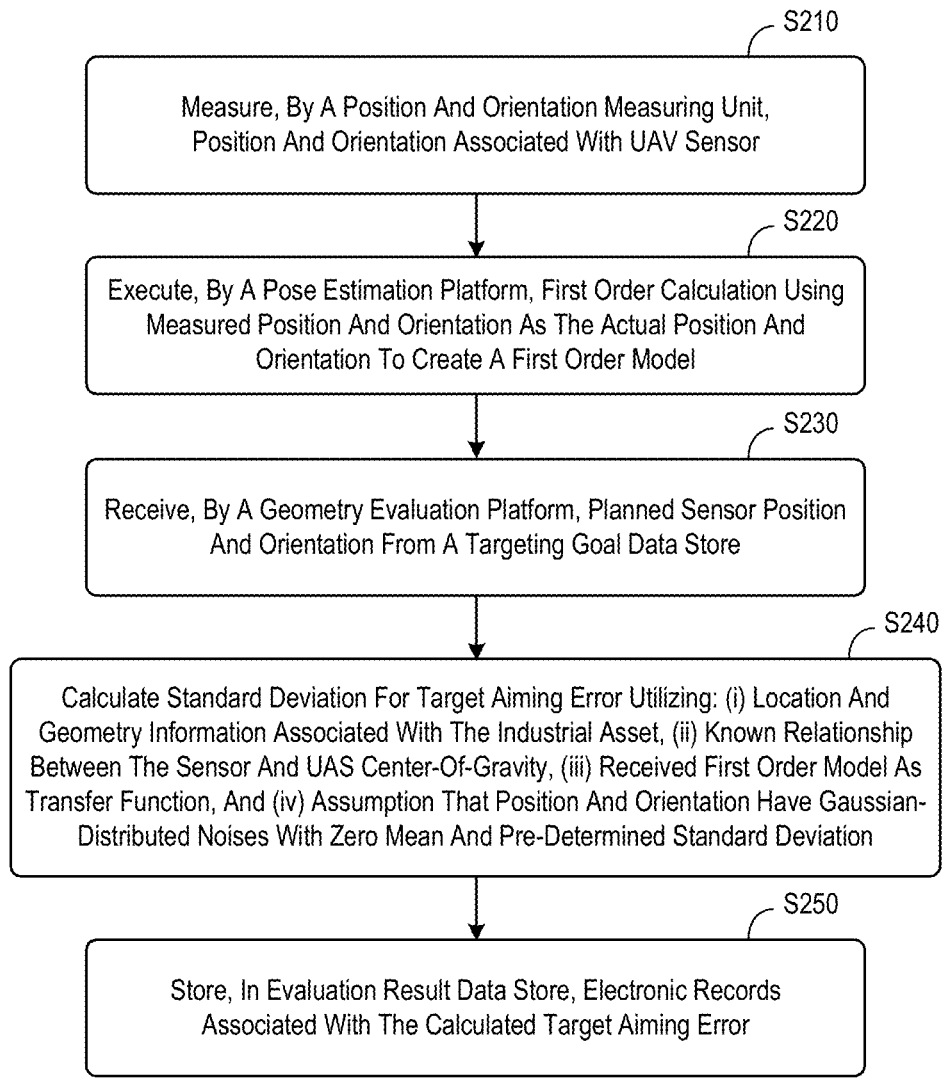
FIG. 2 illustrates a model-based method to evaluate target aiming accuracy according to some embodiments.

The system 100 of FIG. 1 is provided only as an example, and embodiments may be associated with additional elements or components. According to some embodiments, the elements of the system 100 automatically support interactive user interface displays over a distributed communication network. FIG. 2 illustrates a method 200 that might be performed by some or all of the elements of the system 100 described with respect to FIG. 1, or any other system, according to some embodiments of the present invention. The flow charts described herein do not imply a fixed order to the steps, and embodiments of the present invention may be practiced in any order that is practicable. Note that any of the methods described herein may be performed by hardware, software, or any combination of these approaches. For example, a computer-readable storage medium may store thereon instructions that when executed by a machine result in performance according to any of the embodiments described herein.

At S210, a position and orientation measuring unit may measure a position and orientation associated with a UAV sensor (e.g., a camera). The position and orientation measuring unit may include or receive information from an IMU and/or a LIDAR sensor. Moreover, the sensor inspecting the asset might be associated with a camera, a video camera, an infra-red camera, a microphone, a chemical detector, a LIDAR sensor, a radiation detector, etc. As used herein, the phrase "industrial asset" may be associated with, for example, a flare stack, a wind turbine, a power grid, an aircraft, a locomotive, a pipe, a storage tank, a dam, etc.

At S220, a pose estimation platform may execute a first order calculation using the measured position and orientation as the actual position and orientation to create a first order model. At S230, a geometry evaluation platform may receive planned sensor position and orientation from a targeting goal data store. At S240, the system may calculate a standard deviation for a target aiming error of the sensor's projected location on an industrial asset being inspected utilizing:
   location and geometry information associated with the industrial asset (e.g., associated with a cylindrical model or representation of the asset),
   a known relationship between the sensor and a center-of-gravity of the UAV,
   the received first order model as a transfer function, and
   an assumption that the position and orientation of the sensor have Gaussian-distributed noises with zero mean and a pre-determined standard deviation.
At S250, electronic records associated with the calculated target aiming error may then be stored in an evaluation result data store.

Note that the position of a UAV may be measured by GPS and/or Inertial Navigation System ("INS") and the inspection tool or sensor (such as a camera) may be controlled by a gimbal (e.g., motor) to aim the sensor at certain locations on asset. The relative location of the inspection tool/camera to the UAV center of gravity may be known such that the system can calculate the position of the camera by using transformation matrices.

Figure 3A:
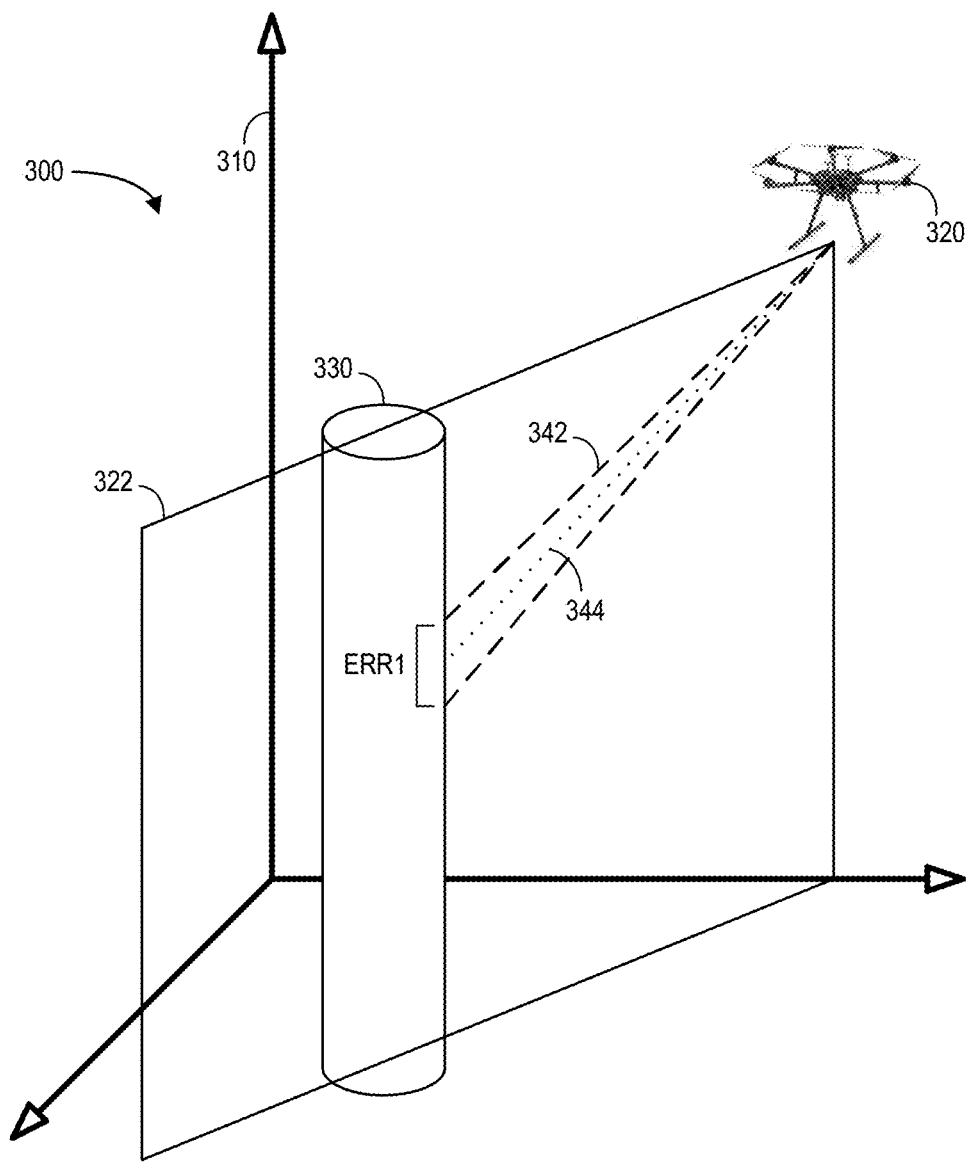
FIG. 3A is an example of an aiming error due to gimbal pitch error in accordance with some embodiments.
Figure 3B:
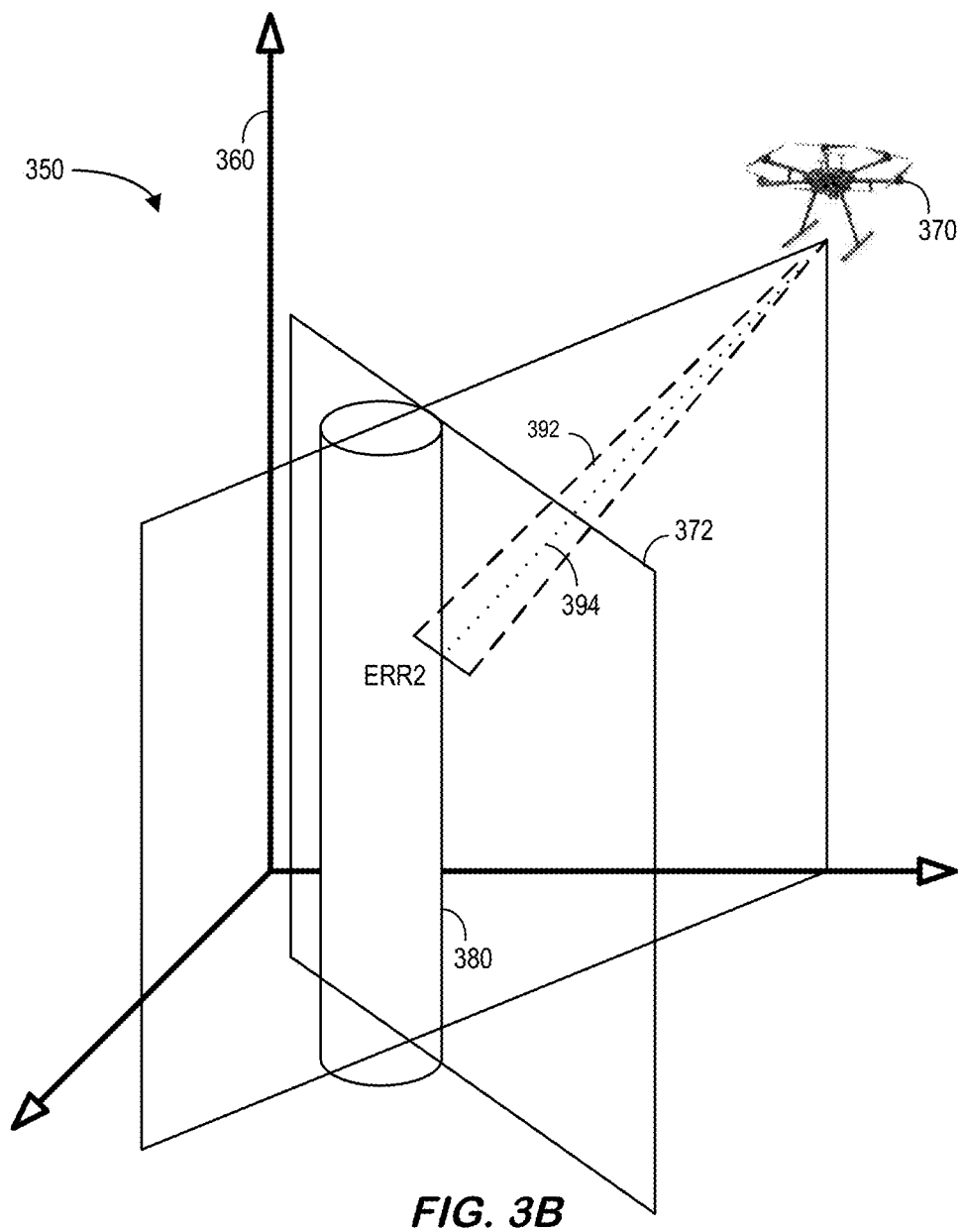
FIG. 3B is an example of an aiming error due to gimbal yaw error according to some embodiments.

Some embodiments described herein may be associated with a model-based method to quantify the aiming error by using planned camera position and orientation, together with actual/measured camera position and orientation. The system may use the location and geometry of the asset and the position and orientation of the camera as the inputs to the model and calculate a projected location on asset. For example, a geometry evaluation platform may calculate a first target aiming error associated with sensor pitch error and a second target aiming error associated with sensor yaw error. FIG. 3A is an example 300 in three dimensions 310 of a UAV 320 aiming error ("ERR1") due to gimbal pitch error in accordance with some embodiments. A plane 322 is defined by the locations of the UAV 320 and an industrial asset model 330 (e.g., a cylindrical model) and ERR1 represents deviation 342 (dashed lines in FIG. 3A) from a desired target aiming line-of-sight 344 (dotted line in FIG. 3A). Similarly, FIG. 3B is an example 350 in three dimensions 360 of a UAV 370 aiming error ("ERR2") due to gimbal yaw error in accordance with some embodiments. A plane 322 is defined by the locations of the UAV 370 and an industrial asset model 380 (e.g., a cylindrical model). In particular the plane 372 is perpendicular to the plate 322 described with respect to FIG. 3A. Note that ERR2 represents deviation 392 (dashed lines in FIG. 3B) from a desired target aiming line-of-sight 394 (dotted line in FIG. 3B).

Figure 4:
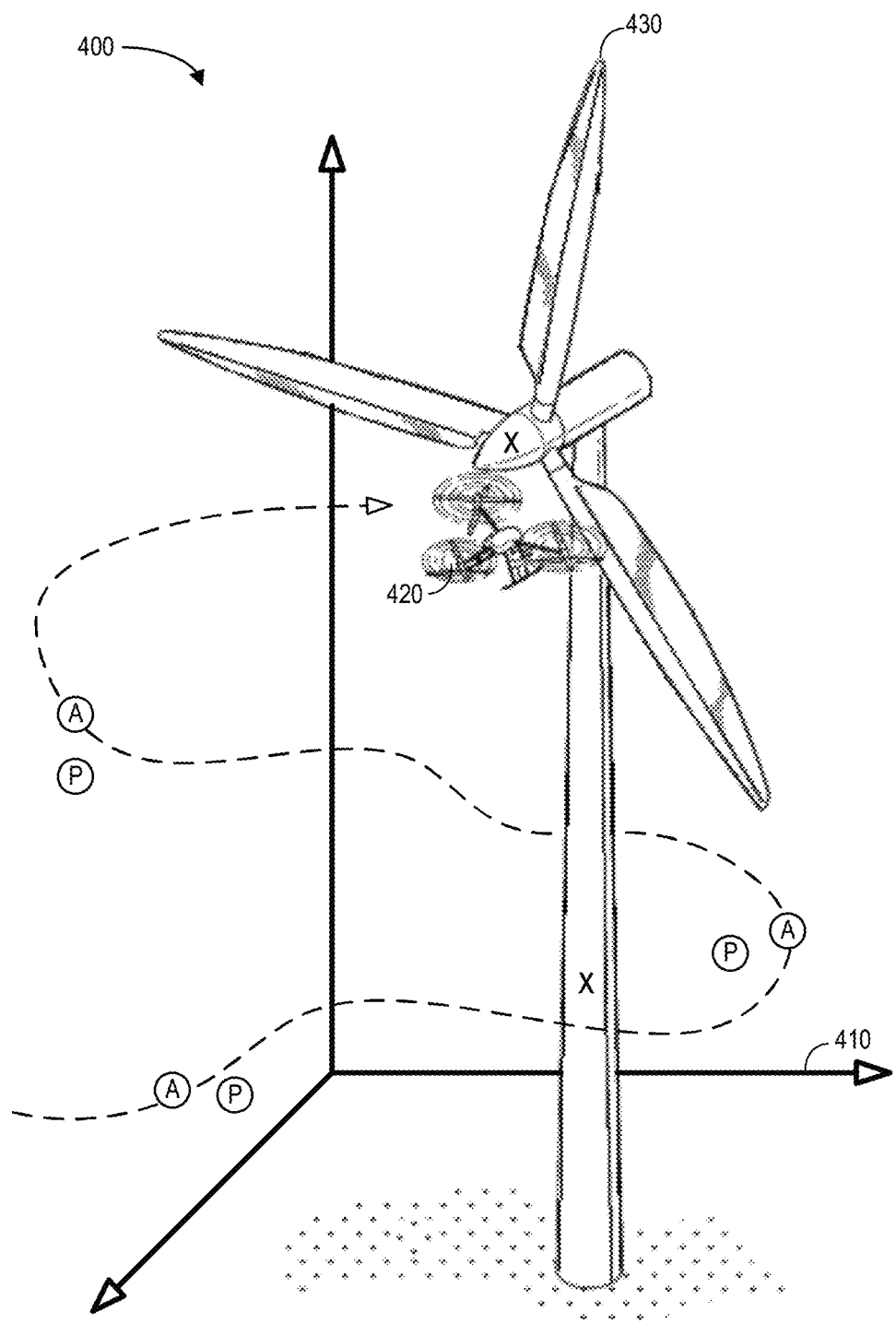
FIG. 4 illustrates positioning accuracy results in accordance with some embodiments.
Figure 5:
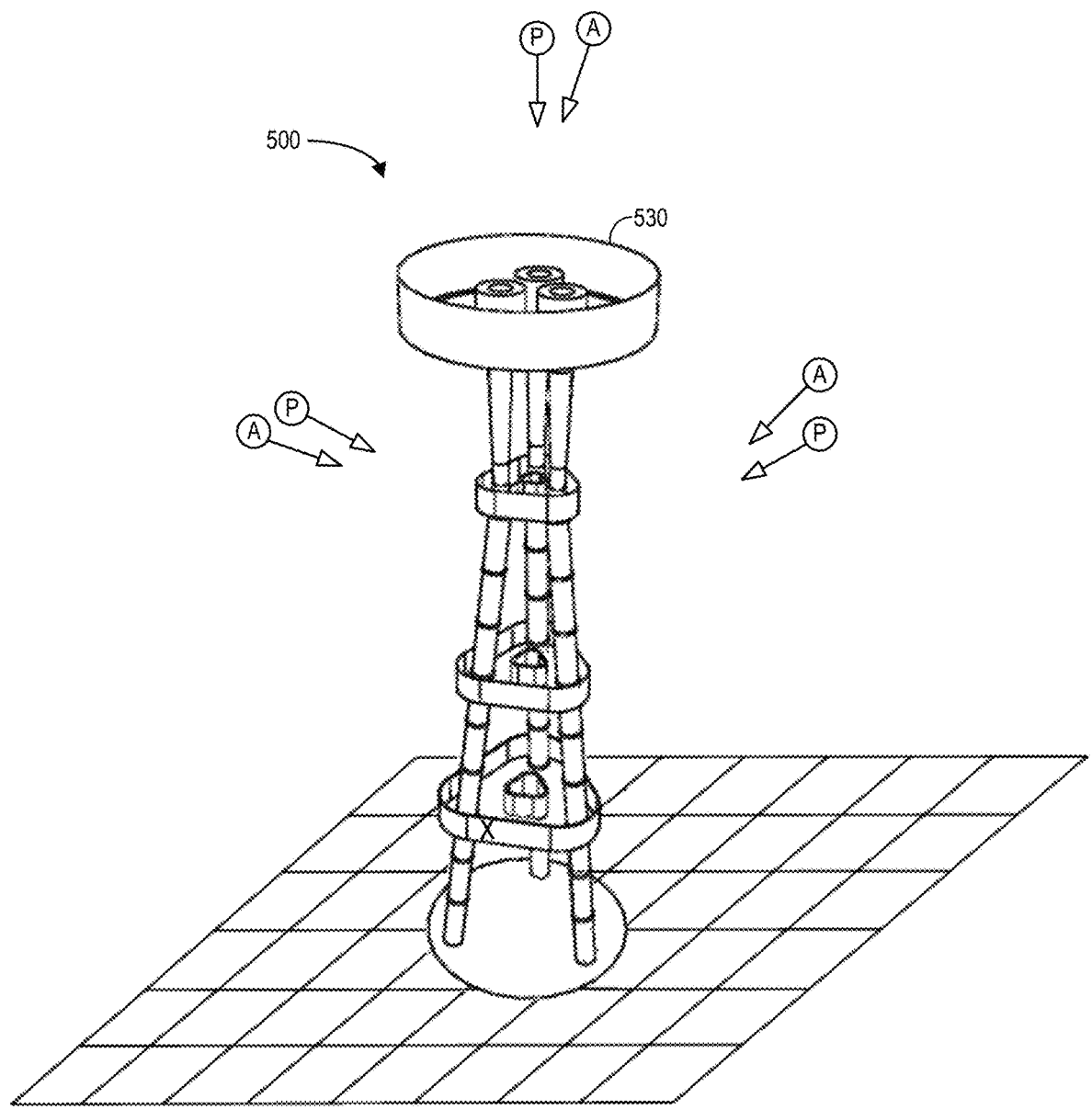
FIG. 5 illustrates aiming accuracy results according to some embodiments.

Note that the system may assume that the industrial asset 380 is a cylinder as a first order approximation. Moreover, more complex models than a cylinder might cause greater projected error due to orientation error and three-dimensional modeling error, and, as a result, a cylinder model might be utilized even when a three-dimensional model of the industrial asset is available. In the first order calculation, one assumption might be made: that the measured position and orientation are the actual position and orientation (e.g., the sensor noise is not included). To include the effect of sensor noise, the system may assume that the position and orientation measurements have noises that are Gaussian distributed with zero means and standard deviation (e.g., from a vendor's specification). Then, the system may use the first order model as a transfer function to calculate the standard deviation of the aiming error. Note that ERR1 and ERR1 in FIGS. 3A and 3B might represent the standard deviation of aiming errors due to gimbal noise only. The total aiming error may be the summation of the aiming bias and the aiming standard deviation. Software may be developed to implement such a model-based aiming accuracy analysis, and calculate targeted location on an industrial asset, based on data from flights at an industrial asset site. For example, FIG. 4 illustrates 400 a three-dimensional 410 example of positioning accuracy results comparing actual ("A") and predicted ("P") locations for a UAV 420 relative to a wind turbine 430 in accordance with some embodiments. FIG. 5 illustrates 500 another three-dimensional example of aiming accuracy results comparing actual ("A") and predicted ("P") aiming relative to a flare stack 530 according to some embodiments.

Figure 6:
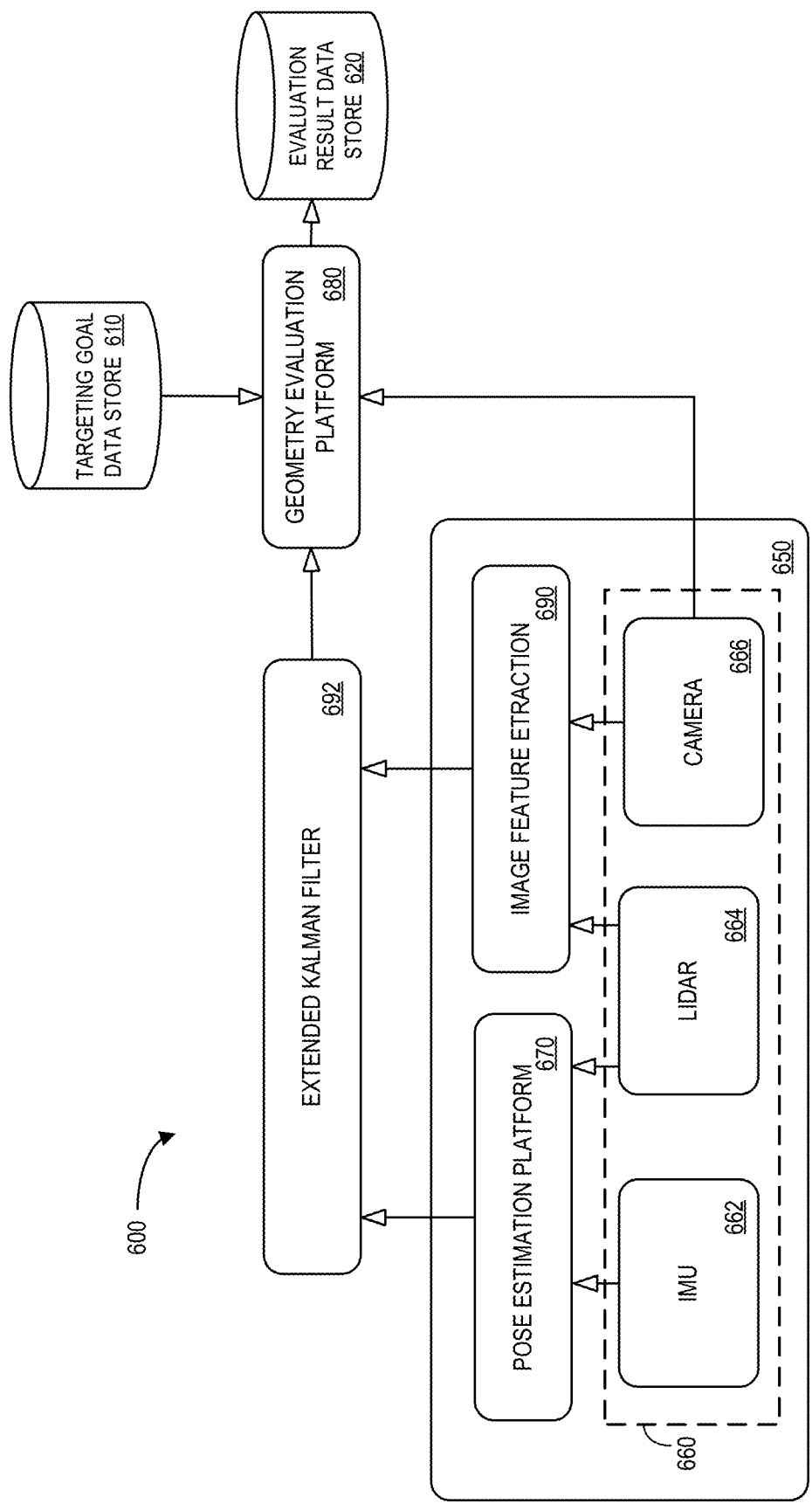
FIG. 6 is a high-level block diagram of target aiming accuracy evaluation system in accordance with another embodiment.

Instead of a model-based approach, some embodiments may utilize image feature recognition techniques to evaluate target aiming accuracy. For example, FIG. 6 is a high-level block diagram of target aiming accuracy evaluation system 600 in accordance with another embodiment. As before, a UAV 650 may include a pose estimation platform 670 that receives information from sensing systems 660 (e.g., an IMU 662 and a LIDAR device 664). According to this embodiment, the UAV 650 also includes an image feature extraction unit 690 that receives information from the sensing systems 660 (e.g., the LIDAR device 664) including a camera 666 (e.g., a high-resolution camera, a video camera, an IR camera, etc.). Information from the pose estimation platform 670 and image feature extraction unit 690 passes through an extended Kalman filter 692 before being provided to a geometry evaluation platform 680. As used herein, the phrase "extended Kalman filter" may refer to, for example, any non-linear version of a Linear Quadratic Estimation ("LQE"), including algorithms that use a series of measurements observed over time (containing statistical noise and other inaccuracies) and produce estimates of unknown variables that may be more accurate than those based on a single measurement alone (e.g., by estimating a joint probability distribution over the variables for each timeframe). The geometry evaluation platform 680 may use data from the extended Kalman filter 692, a targeting goal data store 6110 and the camera 666 to evaluate target aiming accuracy for the UAV 650 and store results in an evaluation result data store 620.

Figure 7:
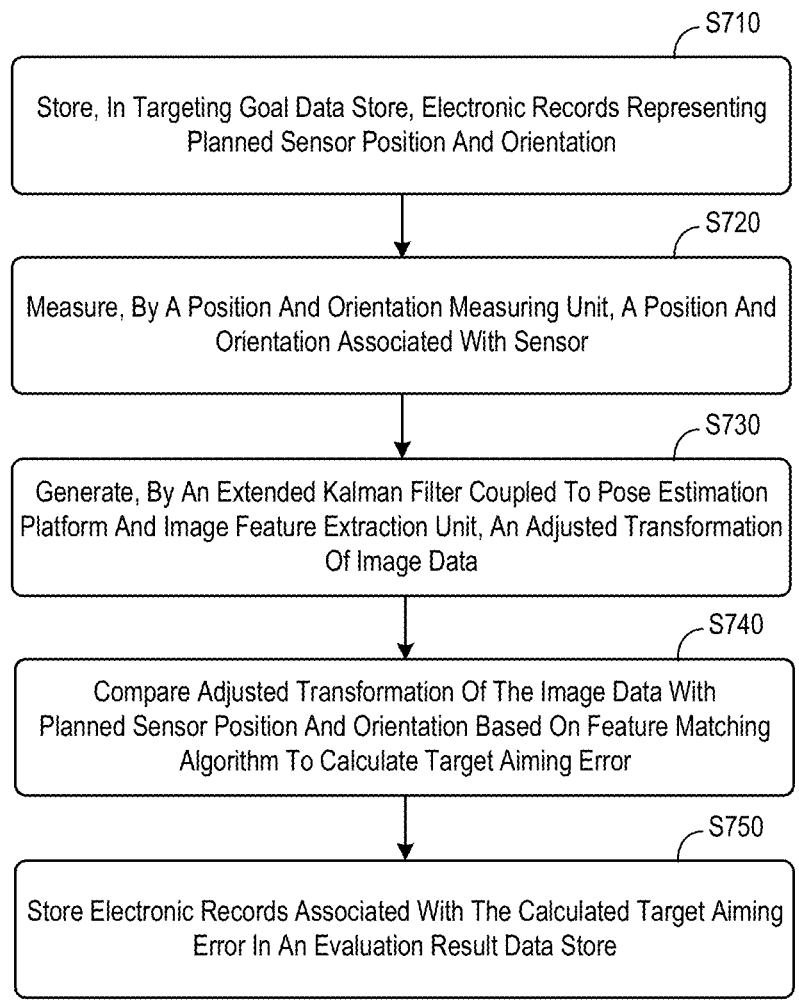
FIG. 7 is a vision feature-based method to evaluate target aiming accuracy according to some embodiments.

FIG. 7 is a vision feature-based method to evaluate target aiming accuracy according to some embodiments. At 710, the system may store, in a targeting goal data store, electronic records representing planned sensor position and orientation. According to some embodiments, an inspection plan may further include a sensor type associated with a point of interest, an anomaly associated with a point of interest, a perspective associated with a point of interest, an amount of time associated with a point of interest (e.g., how long data should be collected), etc.

At 720, a position and orientation measuring unit may measure a position and orientation associated with the sensor. At 730, an extended Kalman filter, coupled to a pose estimation platform and an image feature extraction unit, may generate an adjusted transformation of image data. At 740, a geometry evaluation platform may compare the adjusted transformation of the image data with the planned sensor position and orientation based on a feature matching algorithm to calculate a target aiming error. The system may then store electronic records associated with the calculated target aiming error in an evaluation result data store at 750.

Thus, for a UAV without high accuracy on-board sensors, a vision feature-based method may be provided. Note that an underlying assumption of the model-based method was that the sensor noise has zero mean and is secondary as compared to the control error. For a more general aiming accuracy analysis, embodiments may use images taken at planned locations to directly calculate a bias of a feature on each image as the target aiming error. Such an approach may use a three-dimensional model of an industrial asset and select an appropriate feature (e.g., a metal corner of the asset) during an action planning phase. The approach may also detect the feature from images and calculate the feature location to the image center point as the bias. Note that this approach might utilize accurate information of the asset location and geometry (that is, a three-dimensional model).

Figure 8:
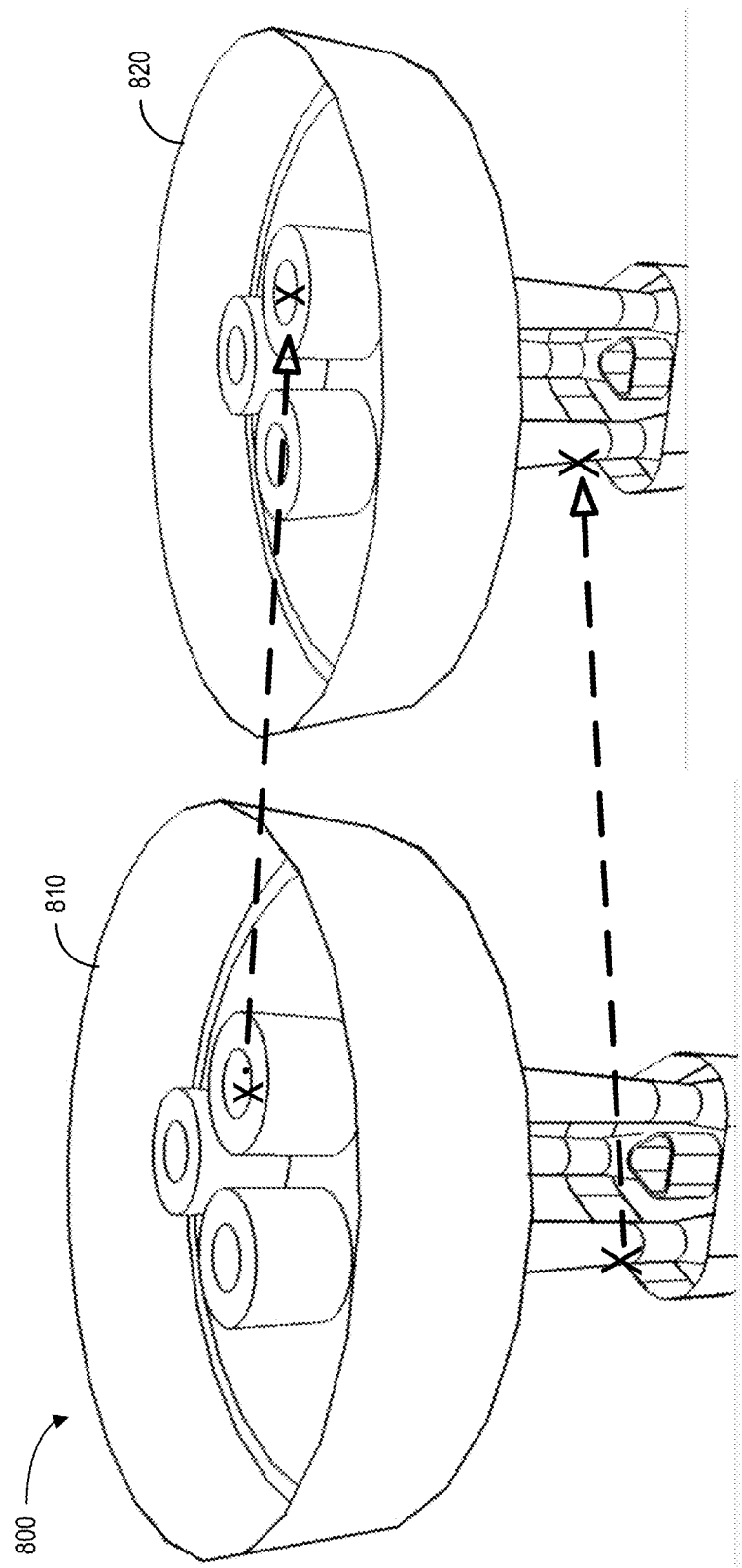
FIG. 8 is an example demonstrating matching-based target aiming accuracy evaluation in accordance with some embodiments.

The extended Kalman filter may incorporate information from pose estimation and image feature extraction to have an adjusted transformation of the images. The images may then be transformed using the result from the extended Kalman filter. Finally, the transformed image may be compared with the targeting goal to compute the evaluation result. For example, FIG. 8 is an example 800 demonstrating matching-based target aiming accuracy evaluation comparing a theoretical image 810 with an actual picture 820 of industrial asset features ("X" in FIG. 8) in accordance with some embodiments.

Figure 9:
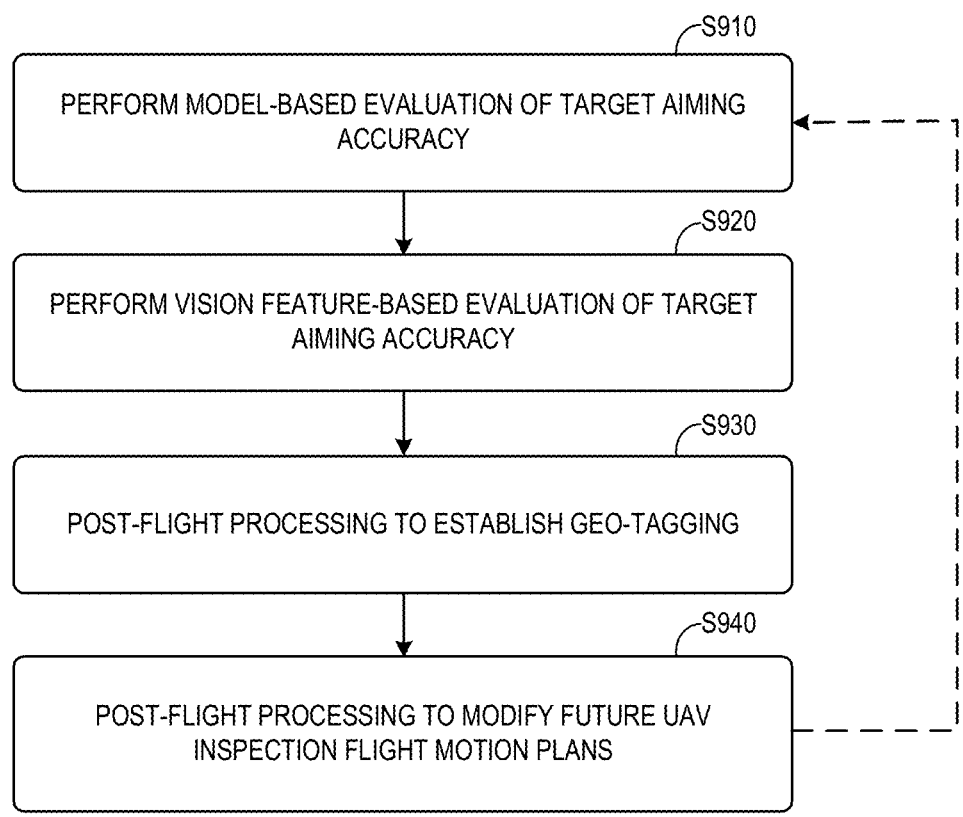
FIG. 9 is a method associated with post-flight processing activities according to some embodiments.
Figure 10:
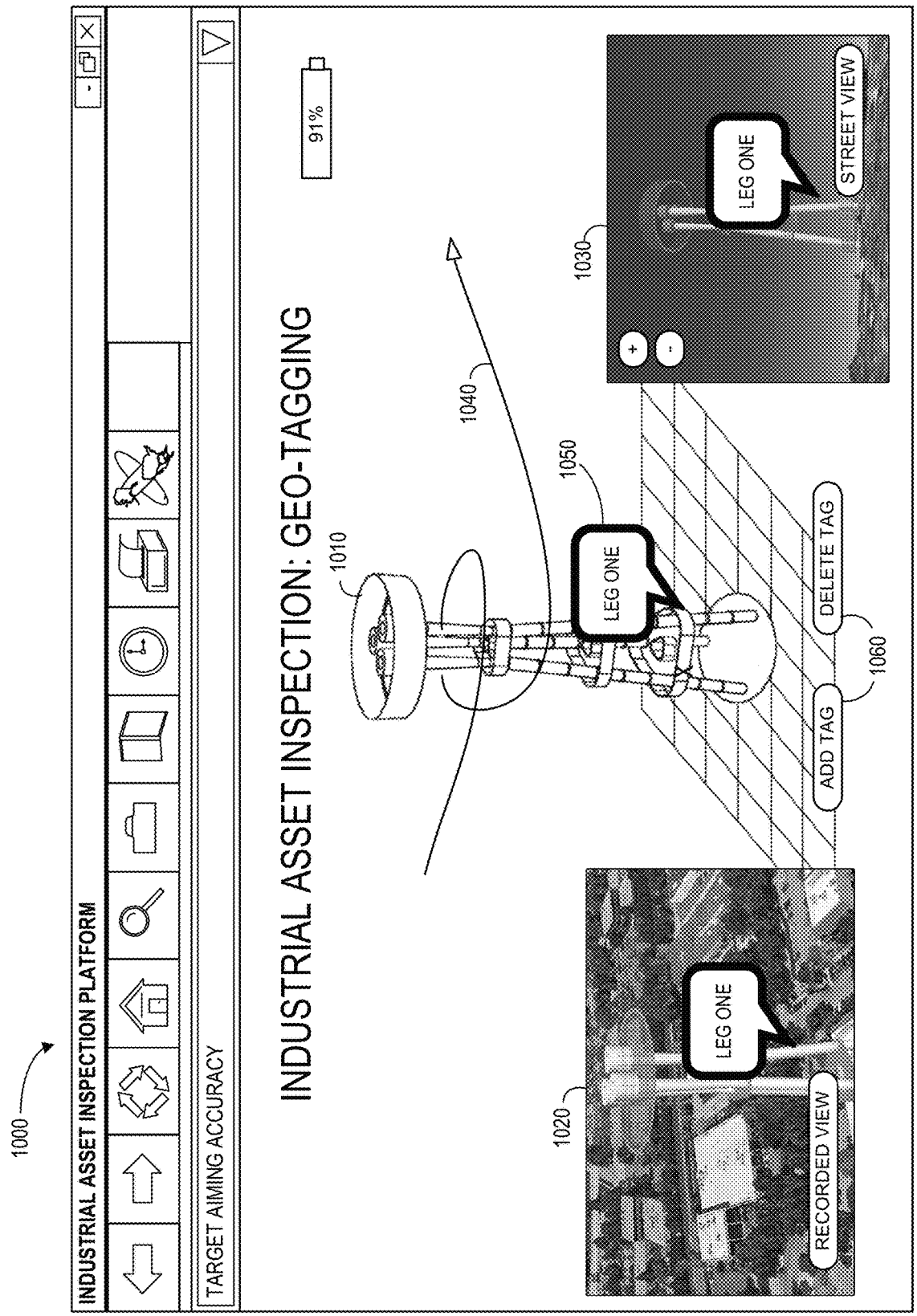
FIG. 10 is an interactive user interface display in accordance with some embodiments.

Evaluations of target aiming accuracy may be used for one or more post-flight ("off-line") processing activities. For example, FIG. 9 is a method associated with post-flight processing activities according to some embodiments. At S910, the system may perform a model-based evaluation of target aiming accuracy. The system may then perform a vision feature-based evaluation of target aiming accuracy at S920. Note that the system might select to either only one approach or both approaches might be implemented simultaneously. Further note that different approaches might be more appropriate in different circumstances (e.g., a sunny day versus an evening flight or a flight on a cloudy day). At S930, post-flight processing may be performed to establish geo-tagging for the industrial asset. For example, FIG. 10 is an interactive user interface display 100 that might be used to define geo-tags for an industrial asset 1010 using a recorded view 1020, street view 1030, etc. associated with an inspection drone flight 1040. In particular, an operator might define geo-tags 1050 in accordance target aiming accuracy evaluations. At S940, post-flight processing may be performed to improve future UAV inspections. For example, future flights might be adjusted so that the drone is positioned closer to an important industrial asset feature because the target aiming was not particular accurate in the initial flight.

In addition to evaluating target aiming accuracy, some embodiments may improve target aiming accuracy during a flight ("on-line"). Note applying a UAV in an autonomous inspection can be challenging because disturbances in the environment and errors in the control systems may result in vibration problems. As a result, many commercial UAV models use special gimbals that have on-board stabilization capabilities to reduce vibration. For example, special hardware mechanisms may be designed to generate over-damping motions for sensors when the UAV is vibrating. Such methods may reduce sensor vibration and improve the quality of sensor data. Note, however, that an over-damping mechanism will increase settling time and, in some industrial inspection tasks, high targeting accuracy may be desired when pointing a gimbal or sensor to a target point. Unfortunately, the non-linear properties of an over-damping mechanism can make fast targeting and high accuracy difficult. According to some embodiments described herein, an onboard control system to handle this problem using the location of the UAV, the orientation of the gimbal/sensor, the know location of industrial assets, and the predefined inspection points as input information. The system may use this information to continuously compute control commands that rotate the gimbal before taking a picture or sensing environmental information. This may modulate the original first-order system to a second-order and improve targeting accuracy.

Figure 11:
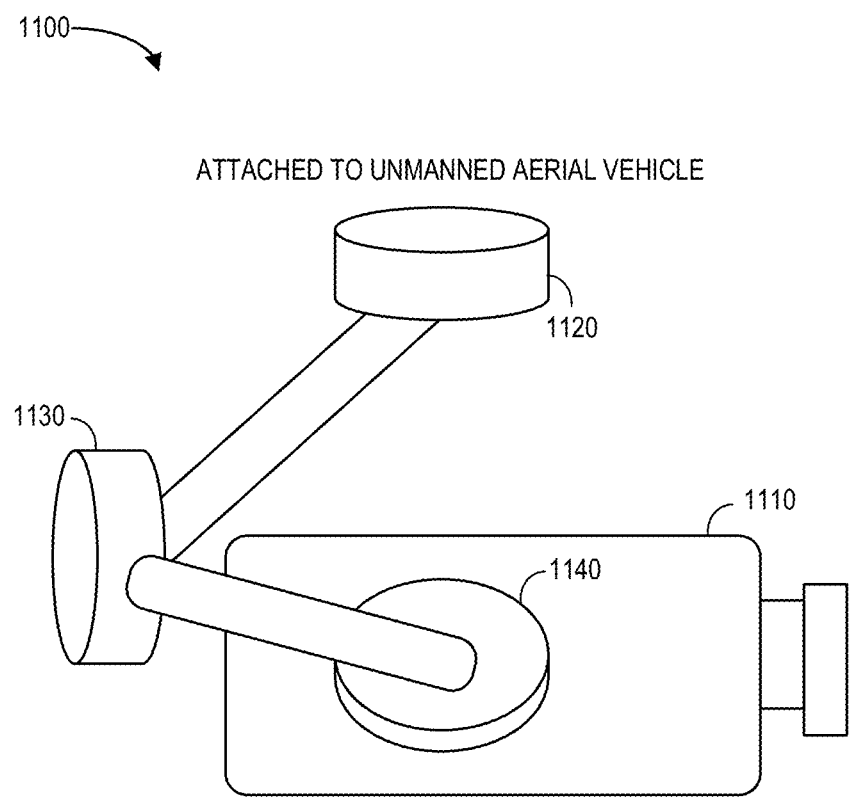
FIG. 11 illustrates gimbals with three degrees of freedom for a sensor according to some embodiments.
Figure 12:
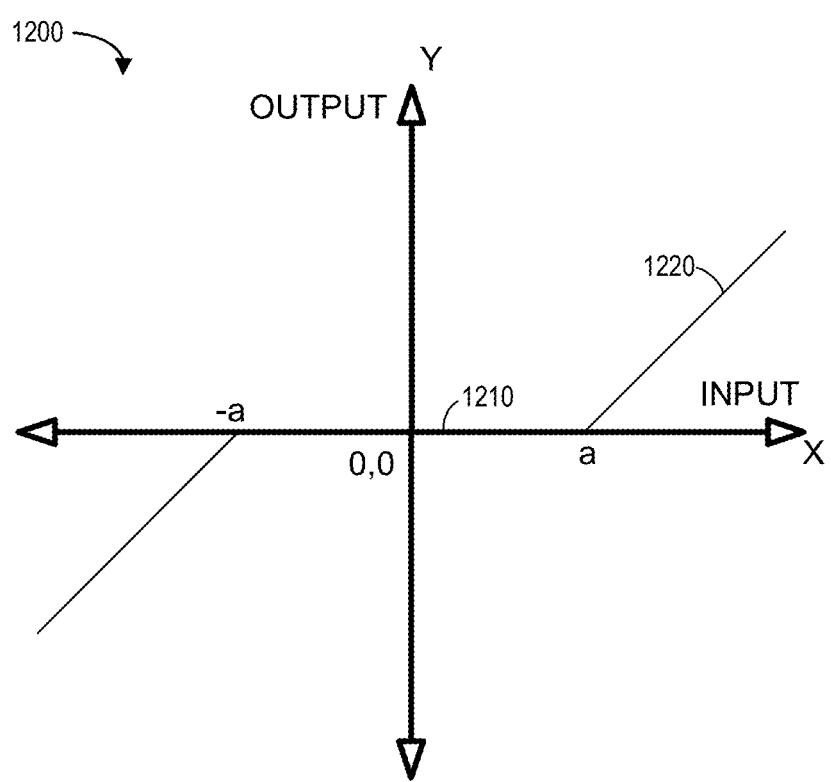
FIG. 12 illustrates a non-linear dead-zone for a gimbal in accordance with some embodiments.

For example, FIG. 11 illustrates a system 1100 with gimbals 1120, 1130, 1140 that provide three degrees of freedom for a UAV sensor 1110 (e.g., a camera) according to some embodiments. The three gimbals 1120, 1130, 1140 may be controlled by three motors that rotate. Each motor control component can be considered as a first-order over-damping mechanism, and the transfer function for each component can be described as:

$$T(s) = \frac{K_p}{1 + \tau s}$$

where $K_p$ is a gain and $\tau$ is a time constant. However, due to mechanical limitations, sometimes a dead-zone is added to the system to avoid frequent vibrations. A dead-zone may represent, for example, a kind of non-linearity in which the system does not respond to a given input until the input reaches a particular level (or it can refer to a condition in which output becomes zero when the input crosses certain limiting value). FIG. 12 is an example 1200 with a graph 1210 of a function 1220 between an input and an output that illustrates a non-linear dead-zone for a gimbal in accordance with some embodiments. Note that if $\tau$, $K_p$ and a are known, a non-linear controller may be designed to move the gimbal quickly and robustly. Unfortunately, $\tau$, $K_p$, and a are not usually known. Note that in some situations the targeting angle may be very important while the rising and settling times are less important.

Figure 13:
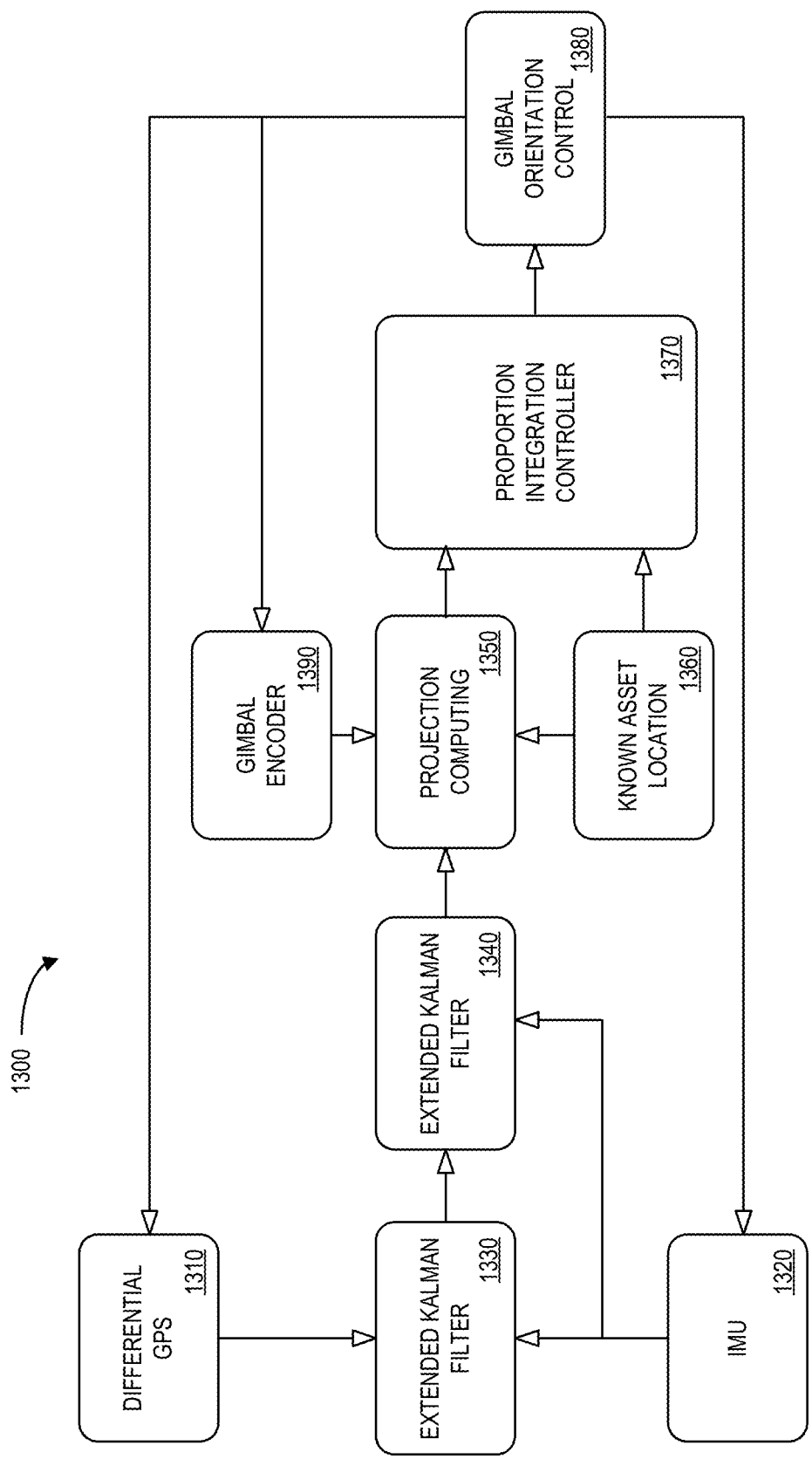
FIG. 13 is a high-level block diagram of a system to improve target aiming accuracy in substantially real-time in accordance with yet another embodiment.

FIG. 13 is a high-level block diagram of a system 1300 to improve target aiming accuracy in substantially real-time in accordance with yet another embodiment. Two sensors are used to get the location of the UAV, which will be used to compute the targeting accuracy. In particular, a differential GPS 1310 may use a Real Time Kinematic ("RTK") technique to enhance the precision of position data derived from satellite-based positioning systems such as Global Navigation Satellite Systems ("GNSS") including GPS, Russia's GLONASS, Europe's Galileo, and China's BeiDou. This method may provide a precise pose estimation for hardware platforms at a relative low update frequency is low (e.g., approximately 1 Hz). An IMU 1320 may be an electronic device that measures and reports a body's specific force, angular rate, and/or the magnetic field surrounding the body using a combination of accelerometers, gyroscopes, and/or magnetometers. The update frequency of an IMU 1320 may be relatively high (e.g., over 100 Hz) as compared to the differential GPS 1310. However, the relatively accuracy of the IMU may be low and drift cannot be ignored.

A first extended Kalman filter 1330 may provide a good estimation of the UAV pose. To make the first step estimation robust, the IMU 1310 may be sampled at the same rate as the differential GPS 1310 and, as a result, the output may run at approximately 1 Hz. A second extended Kalman filter 1340 may be used to provide fast estimation. The second Kalman filter 1314 may run at approximately 100 Hz, for example. The major input of the second Kalman filter 1340 may from the IMU 1320 and the differential GPS 1310 (e.g., RTK) may be used as correction signal.

The estimated pose is used to compute the targeting point on an industrial asset. The projection line of the sensor may be computed using the pose of the platform and the orientation of the gimbal with respect to the platform (e.g., the UAV). A serial transformation may be computed as:

$$T = T_{UAV}^{gimbal} T_{asset}^{UAV}$$

where $T_{UAV}^{gimabal}$ represents a relation between the gimbal and the UAV and $T_{asset}^{UAV}$ represents a relation between the UAV and the industrial asset. The projection line can then be extracted from T. Note that a projection computing unit 1350 may receive information from the second extended Kalman filter 1340, a gimbal encoder 1390, and a known asset location 1360.

The intersection point can then be computed using T and the model of the industrial asset. The point computed and the predefined point on the industrial asset may be used as an input of a Proportion Integration ("PI") controller 1370 along with the known asset location 1360:

$$A_d = K_p(P_{desired} - P_{actual}) + K_i \int (P_{desired} - P_{actual})$$

where $P_{desired}$ is a desired position and $P_{actual}$ is an actual position. The output of the PI controller 1370 may be provided to a gimbal orientation control 1380 which, in turn, can provide data to the differential GPS 1310, the IMU 1320, and/or the gimbal encoder 1390. When $A_d$ is below a predetermined threshold value, a picture may be taken and the robot platform (UAV) may move to the next point of interest or waypoint.

Thus, the system 1300 may use the differential GPS 1310 (RTK), the IMU 1320, and encoders to compute the projection line. When more sensors are available, the number of extended Kalman filters may be increased to provide an even more robust estimation.

Figure 14:
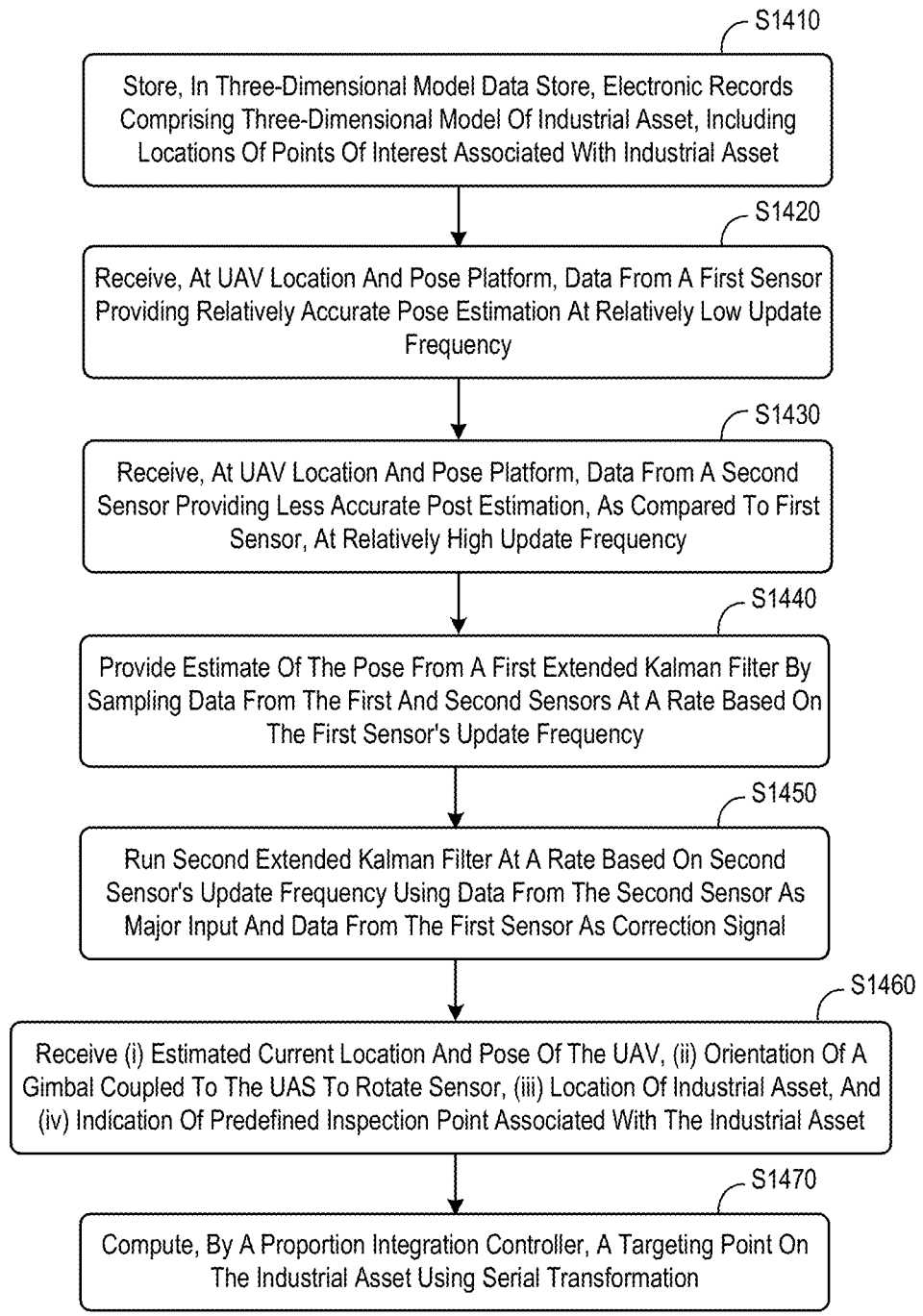
FIG. 14 is a method to improve target aiming accuracy in accordance with some embodiments.

FIG. 14 is a method to improve target aiming accuracy in accordance with some embodiments. At S1410, the system may store, in a three-dimensional model data store, electronic records comprising a three-dimensional model of an industrial asset, the three-dimensional model may include, according to some embodiments, locations of a plurality of points of interest associated with the industrial asset. At S1420, a UAV location and pose platform may receive data from or measure data with a first sensor (e.g., RTK, GPS, etc.) providing a relatively accurate pose estimation at a relatively low update frequency. At S1430, the UAV location and pose platform may receive data from or measure data with a second sensor (e.g., IMU) providing a less accurate pose estimation, as compared to the first sensor, at a relatively high update frequency. At S1440, an estimate of the pose may be provided from a first extended Kalman filter by sampling data from the first and second sensors at a rate based on the first sensor's update frequency. At S1450, a second extended Kalman filter may run at a rate based on the second sensor's update frequency using data from the second sensor as a major input and data from the first sensor as a correction signal.

At S1460, a projection computing platform may receive:
- an estimated current location and pose of the UAV from the UAV location and pose platform,
- an orientation of a gimbal coupled to the UAV to rotate the sensor,
- a location of the industrial asset from the three-dimensional model data store, and
- an indication of a predefined inspection point associated with the industrial asset.

At S1470, a PI controller may compute a targeting point on the industrial asset using the following serial transformation:

$$T = T_{UAV}^{gimbal} T_{asset}^{UAV}$$

where $T_{UAV}^{gimabal}$ represents a relation between the gimbal and the UAV and $T_{asset}^{UAV}$ represents a relation between the UAV and the industrial asset.

According to some embodiments, the gimbal is associated with a motor that rotates the sensor. Moreover, the PI controller may continuously compute motor control commands to rotate the gimble before sensing a characteristic of the industrial asset. According to some embodiments, the motor is associated with a first-order damping mechanism having a dead zone a and a transfer function of:

$$T(s) = \frac{K_p}{1 + \tau s}$$

where Kp is a gain and $\tau$ is a time constant. Moreover, the PI controller may sense the characteristic of the industrial asset when a motor control command $A_d$ is below a predetermined threshold value:

$$A_d = K_p(P_{desired} - P_{actual}) + K_i \int (P_{desired} - P_{actual})$$

where $P_{desired}$ is a desired position and $P_{actual}$ is an actual position.

Figure 15:
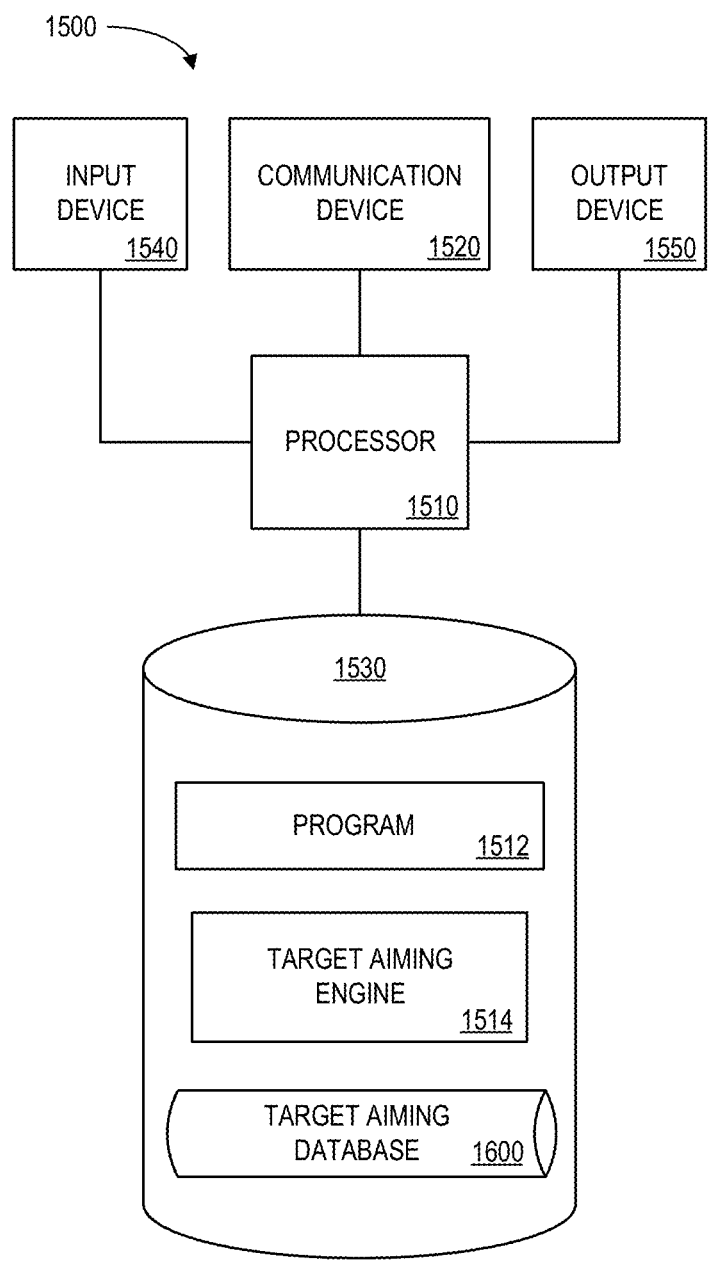
FIG. 15 illustrates a monitoring platform in accordance with some embodiments.

The embodiments described herein may be implemented using any number of different hardware configurations. For example, FIG. 15 is block diagram of a monitoring platform 1500 that may be, for example, associated with the systems 100, 600, 1300 of FIGS. 1, 6, and 13, respectively. The monitoring platform 1500 comprises a processor 1510, such as one or more commercially available Central Processing Units ("CPUs") in the form of one-chip microprocessors, coupled to a communication device 1520 configured to communicate via a communication network (not shown in FIG. 15). The communication device 1520 may be used to communicate, for example, with one or more remote robots, UAV, human operator devices, etc. The monitoring platform 1500 further includes an input device 1540 (e.g., a computer mouse and/or keyboard to input inspection information, asset modeling data, drone control signals, etc.) and/an output device 1550 (e.g., a computer monitor to render a user interface display, transmit control signals to inspection robots, etc.). According to some embodiments, a mobile device and/or PC may be used to exchange information with the monitoring platform 1500.

The processor 1510 also communicates with a storage device 1530. The storage device 1530 may comprise any appropriate information storage device, including combinations of magnetic storage devices (e.g., a hard disk drive), optical storage devices, mobile telephones, and/or semiconductor memory devices. The storage device 1530 stores a program 1512 and/or an asset inspection engine 1514 for controlling the processor 1510. The processor 1510 performs instructions of the programs 1512, 1514, and thereby operates in accordance with any of the embodiments described herein. For example, according to some embodiments the processor 1510 may measure a position and orientation associated with a UAV sensor. The processor 1510 may execute a first order calculation using the measured position and orientation as the actual position and orientation to create a first order model. The processor 1510 may receive planned sensor position and orientation from a targeting goal data store and calculate a standard deviation for a target aiming error utilizing: (i) location and geometry information associated with the industrial asset, (ii) a known relationship between the sensor and a center-of-gravity of the UAV, (iii) the first order model as a transfer function, and (iv) an assumption that the position and orientation of the sensor have Gaussian-distributed noises with zero mean and a pre-determined standard deviation.

According to other embodiments, the processor 1510 may measure a position and orientation associated with the sensor. The processor 1510 may receive image data from a camera of the UAV. An extended Kalman filter may generate an adjusted transformation of the image data, and the processor 1510 may: receive the adjusted transformation of the image, receive the planned sensor position and orientation, and compare the adjusted transformation of the image data with the planned sensor position and orientation based on a feature matching algorithm to calculate a target aiming error.

According to still other embodiments, a three-dimensional model data may store containing electronic records comprising a three-dimensional model of an industrial asset, the three-dimensional model including locations of a plurality of points of interest associated with the industrial asset. A UAV location and pose platform may include: a first sensor providing a relatively accurate pose estimation at a relatively low update frequency; and a second sensor providing a less accurate pose estimation, as compared to the first sensor, at a relatively high update frequency. A first extended Kalman filter may provide an estimation of the pose by sampling data from the first and second sensors at a rate based on the first sensor's update frequency. A second extended Kalman filter may run at a rate based on the second sensor's update frequency using data from the second sensor as a major input and data from the first sensor as a correction signal. The processor 1510 may then receive: (i) an estimated current location and pose of the UAV from the UAV location and pose platform, (ii) an orientation of a gimbal coupled to the UAV to rotate the sensor, (iii) a location of the industrial asset from the three-dimensional model data store, and (iv) an indication of a predefined inspection point associated with the industrial asset. The processor 1510 may compute a targeting point on the industrial asset using the following serial transformation:

$$T = T_{UAV}^{gimbal} T_{asset}^{UAV}$$

where $T_{UAV}^{gimabal}$ represents a relation between the gimbal and the UAV and $T_{asset}^{UAV}$ represents a relation between the UAV and the industrial asset.

The programs 1512, 1514 may be stored in a compressed, uncompiled and/or encrypted format. The programs 1512, 1514 may furthermore include other program elements, such as an operating system, clipboard application, a database management system, and/or device drivers used by the processor 1510 to interface with peripheral devices.

As used herein, information may be "received" by or "transmitted" to, for example: (i) the monitoring platform 1500 from another device; or (ii) a software application or module within the monitoring platform 1500 from another software application, module, or any other source.

In some embodiments (such as the one shown in FIG. 15), the storage device 1530 further stores target aiming database 1600. An example of a database that may be used in connection with the monitoring platform 1500 will now be described in detail with respect to FIG. 16. Note that the database described herein is only one example, and additional and/or different information may be stored therein. Moreover, various databases might be split or combined in accordance with any of the embodiments described herein.

Referring to FIG. 16, a table is shown that represents the target aiming database 1600 that may be stored at the monitoring platform 1500 according to some embodiments. The table may include, for example, entries identifying asset inspection processes that have been executed in accordance with any of the embodiments described herein. The table may also define fields 1602, 1604, 1606, 1608, 1610, 1612 for each of the entries. The fields 1602, 1604, 1606, 1608, 1610, 1612 may, according to some embodiments, specify: an asset inspection identifier 1602, an asset identifier 1604, three-dimensional model data 1606, inspection plan data 1608, collected sensor data 1610, and target aiming accuracy 1612. The asset inspection database 1600 may be created and updated, for example, when an industrial asset is installed, inspections are performed, etc.

The asset inspection identifier 1602 may be, for example, a unique alphanumeric code identifying an inspection process that was performed by an autonomous inspection robot under the supervision of a human monitor (and might include the date and/or time of the inspection). The asset identifier 1604 might identify the industrial asset that was being inspected. The three-dimensional model data 1606 (e.g., including Points of Interest ("POI")) and the inspection plan data 1608 might comprise the information that used to conduct the inspection. The collected sensor data 1610 might include the pictures, videos, etc. used to record characteristics of the industrial asset being inspected. The target aiming accuracy 1612 might reflect a percentage deviation from a desired location or angle, a category ("accurate" or "inaccurate"), a distance, etc.

Thus, some embodiments may provide systems and methods to evaluate and/or improve target aiming accuracy in an automated and efficient manner. This may reduce the cost of industrial asset systems and/or inspection UAV without requiring extra hardware or substantial modification to software. Moreover, embodiments might be incorporated both on-line and/or off-line to use sensor information fusion methods when estimating targeting points on industrial assets. Note that embodiments be used for different industrial platforms and/or different vendors. Embodiments described herein may improve the targeting accuracy of industrial robotic inspection systems, which may improve the analytics results and the whole system performance.

The following illustrates various additional embodiments of the invention. These do not constitute a definition of all possible embodiments, and those skilled in the art will understand that the present invention is applicable to many other embodiments. Further, although the following embodiments are briefly described for clarity, those skilled in the art will understand how to make any changes, if necessary, to the above-described apparatus and methods to accommodate these and other embodiments and applications.

Although specific hardware and data configurations have been described herein, note that any number of other configurations may be provided in accordance with embodiments of the present invention (e.g., some of the information associated with the databases described herein may be combined or stored in external systems). Moreover, although some embodiments are focused on certain types of industrial asset damage or inspection, any of the embodiments described herein could be applied to other situations, including cyber-attacks, weather damage, etc. Moreover, the displays described herein are used only as examples, and any number of other types of displays could be used.

The present invention has been described in terms of several embodiments solely for the purpose of illustration. Persons skilled in the art will recognize from this description that the invention is not limited to the embodiments described, but may be practiced with modifications and alterations limited only by the spirit and scope of the appended claims.

The invention claimed is:

1. A system for evaluating a target aiming accuracy of a sensor of an Unmanned Aerial Vehicle (UAV), comprising:
   a position and orientation measuring unit configured to measure a position and orientation of the sensor;
   a pose estimation platform coupled to the position and orientation measuring unit, wherein the pose estimation platform is configured to:
   receive the position and orientation of the sensor; and
   execute a first order calculation using the position and orientation as an actual position and orientation of the sensor to create a first order model;
   a targeting goal data store containing electronic records representing a planned sensor position and orientation of the sensor;
   a geometry evaluation platform coupled to the pose estimation platform and the targeting goal data store, wherein the geometry evaluation platform is configured to:
   receive the first order model from the pose estimation platform;
   receive the planned sensor position and orientation from the targeting goal data store; and
   determine a standard deviation for a target aiming error of a projected location of the sensor on an industrial asset being inspected utilizing: (i) location and geometry information associated with the industrial asset, (ii) a known relationship between the sensor and a center-of-gravity of the UAV, (iii) the first order model received as a transfer function, and (iv) an assumption that the position and orientation of the sensor have Gaussian-distributed noises with zero mean and a pre-determined standard deviation;
   an evaluation result data store containing electronic records associated with the target aiming error; and
   an interactive user interface, wherein the interactive user interface is configured to display results of the target aiming error and to receive a user input to adjust a flight path of the UAV.

2. The system of claim 1, wherein the location and geometry information associated with the industrial asset comprise a cylindrical representation of the industrial asset.

3. The system of claim 1, wherein the geometry evaluation platform is configured to calculate a first target aiming error associated with sensor pitch error and a second target aiming error associated with sensor yaw error.

4. The system of claim 1, wherein the position and orientation measuring unit includes at least one of: (i) an inertial measurement unit, and (ii) a Light Detection and Ranging (LIDAR) sensor.

5. The system of claim 1, wherein the sensor includes at least one of: (i) a camera, (ii) a video camera, (iii) an infra-red camera, (iv) a microphone, (v) a chemical detector, (vi) a Light Detection and Ranging (LIDAR) sensor, and (vii) a radiation detector.

6. The system of claim 1, wherein the industrial asset includes at least one of: (i) a flare stack, (ii) a wind turbine, (iii) a power grid, (iv) an aircraft, (v) a locomotive, (vi) a pipe, (vii) a storage tank, and (viii) a dam.

7. The system of claim 1, wherein the interactive user interface is configured to receive an additional user input for performance of a post-flight geo-tagging process.

8. The system of claim 1, wherein the targeting goal data store stores an inspection plan that includes at least one of: (i) a sensor type associated with a point of interest, (ii) an anomaly associated with the point of interest, (iii) a perspective associated with the point of interest, and (iv) an amount of time associated with the point of interest.

9. The system of claim 1, further comprising:
   an image feature extraction unit configured to receive image data from a camera of the UAV;
   an extended Kalman filter coupled to the pose estimation platform and the image feature extraction unit, wherein the extended Kalman filter is configured to generate an adjusted transformation of the image data; and
   a second geometry evaluation platform coupled to the extended Kalman filter, the camera, and the targeting goal data store, wherein the second geometry evaluation platform is configured to:
   receive the adjusted transformation of the image;
   receive the planned sensor position and orientation; and
   compare the adjusted transformation of the image data with the planned sensor position and orientation based on a feature matching algorithm to calculate a second target aiming error, wherein the evaluation result data store is configured to store an indication associated with the second target aiming error.

10. A system for evaluating a target aiming accuracy of a sensor of an Unmanned Aerial Vehicle (UAV), comprising:

a targeting goal data store containing electronic records representing a planned sensor position and orientation of the sensor;
a position and orientation measuring unit configured to measure a position and orientation of the sensor;
a pose estimation platform coupled to the position and orientation measuring unit;
an image feature extraction unit configured to receive image data from a camera of the UAV;
an extended Kalman filter coupled to the pose estimation platform and the image feature extraction unit, wherein the extended Kalman filter is configured to generate an adjusted transformation of the image data;
a geometry evaluation platform coupled to the extended Kalman filter, the camera, and the targeting goal data store, wherein the geometry evaluation platform is configured to:
receive the adjusted transformation of the image;
receive the planned sensor position and orientation; and
compare the adjusted transformation of the image data with the planned sensor position and orientation based on a feature matching algorithm to calculate a target aiming error; and
an evaluation result data store containing electronic records associated with the target aiming error.

11. The system of claim 10, wherein the position and orientation measuring unit includes at least one of: (i) an inertial measurement unit, and (ii) a Light Detection and Ranging (LIDAR) sensor.

12. The system of claim 10, wherein the sensor includes at least one of: (i) a camera, (ii) a video camera, (iii) an infra-red camera, (iv) a microphone, (v) a chemical detector, (vi) a Light Detection and Ranging (LIDAR) sensor, and (vii) a radiation detector.

13. The system of claim 10, wherein the industrial asset includes at least one of: (i) a flare stack, (ii) a wind turbine, (iii) a power grid, (iv) an aircraft, (v) a locomotive, (vi) a pipe, (vii) a storage tank, and (viii) a dam.

14. The system of claim 10, comprising an interactive display configured to receive inputs indicative of at least one of the following: (i) a post-flight geo-tagging process, and (ii) a post-flight motion planning process to improve future UAV inspections.

15. A system for improving a target aiming accuracy of a sensor of an Unmanned Aerial Vehicle (UAV) in real-time, comprising:
a three-dimensional model data store containing electronic records comprising a three-dimensional model of an industrial asset, the three-dimensional model including locations of a plurality of points of interest associated with the industrial asset;
a UAV location and pose platform, including:
a first sensor providing a first pose estimation at a first update frequency;
a second sensor providing a second pose estimation that is less accurate than the first pose estimation at a second update frequency, wherein the second update frequency is greater than the first update frequency;
a first extended Kalman filter configured to provide an estimation of a pose of the UAV by sampling data from the first and second sensors at a first rate based on the first update frequency of the first sensor; and
a second extended Kalman filter configured to run at a second rate based on the second update frequency of the second sensor using data from the second sensor as a major input and data from the first sensor as a correction signal;
a projection computing platform coupled to the three-dimensional model data store and the UAV location and pose platform, wherein the projection computing platform is configured to receive: (i) an estimated current location and pose of the UAV from the UAV location and pose platform, (ii) an orientation of a gimbal coupled to the UAV and configured to rotate the sensor, (iii) a location of the industrial asset from the three-dimensional model data store, and (iv) an indication of a predefined inspection point associated with the industrial asset; and
a proportion integration controller coupled to the projection computing platform and the three-dimensional model data store, wherein the proportion integration controller is configured to compute a targeting point on the industrial asset using a serial transformation represented as:

$$T = T_{UAV}^{gimbal} T_{asset}^{UAV}$$

where $T_{UAV}^{gimbal}$ represents a first relation between the gimbal and the UAV and $T_{asset}^{UAV}$ represents a second relation between the UAV and the industrial asset.

16. The system of claim 15, wherein the first sensor includes a Global Navigation Satellite System (GNSS).

17. The system of claim 16, wherein the second sensor is an inertial measurement unit.

18. The system of claim 15, wherein the gimbal includes a motor configured to rotate the sensor.

19. The system of claim 18, wherein the proportion integration controller is configured to compute motor control commands to rotate the gimbal before sensing a characteristic of the industrial asset.

* * * * *